United States Patent
Nama et al.

(10) Patent No.: US 10,492,079 B2
(45) Date of Patent: Nov. 26, 2019

(54) SYSTEM AND METHOD FOR CITIZENS BAND RADIO SPECTRUM (CBRS) DUAL CELL RADIO NODE

(71) Applicant: Corning Optical Communications LLC, Charlotte, NC (US)

(72) Inventors: Hithesh Nama, Los Altos, CA (US); Airin Cherian, San Jose, CA (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 15/665,763

(22) Filed: Aug. 1, 2017

(65) Prior Publication Data
US 2018/0035301 A1 Feb. 1, 2018

Related U.S. Application Data

(60) Provisional application No. 62/369,342, filed on Aug. 1, 2016.

(51) Int. Cl.
*H04W 16/14* (2009.01)
*H04W 16/02* (2009.01)
(Continued)

(52) U.S. Cl.
CPC .......... *H04W 16/14* (2013.01); *H04W 16/02* (2013.01); *H04W 16/18* (2013.01); *H04W 16/32* (2013.01);
(Continued)

(58) Field of Classification Search
CPC ..... H04W 16/14; H04W 16/02; H04W 16/18; H04W 16/32; H04W 84/045; H04W 84/18; H04W 88/10; H04W 88/12
(Continued)

(56) References Cited

U.S. PATENT DOCUMENTS

| 4,099,137 A | 7/1978 | Alm, Jr. et al. |
| 9,271,278 B2 * | 2/2016 | Heo ................. H04W 72/0413 |

(Continued)

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Technical Specification 36.300, Version 13.4.0, 3GPP Organizational Partners, Jun. 2016, 310 pages.

(Continued)

*Primary Examiner* — Mong-Thuy T Tran
(74) *Attorney, Agent, or Firm* — C. Keith Montgomery

(57) ABSTRACT

A radio node having a primary cell identity and a secondary cell identity operates the two cell identities at the same time. They are localized and occupy the same geographic location, but operate at different frequencies/channels. The primary cell (PCell) may encompass, e.g., one or more channels, e.g., 20 MHz, and the same can act as a coverage layer, providing a stable spectrum for communications, as these channels do not change. The secondary cell (SCell) operates at the same time, and can operate with higher reuse using multiple GAA channels as they are available (their availability may vary as they are dynamically allocated). This layer can act as a "capacity" layer as the multiple GAA channels can allow for high throughput when needed. That is, they are dynamically allocated, but high capacity can be enabled as a high number of such channels may be available at any one time.

14 Claims, 27 Drawing Sheets

(51) Int. Cl.
   *H04W 16/18*   (2009.01)
   *H04W 16/32*   (2009.01)
   *H04W 88/12*   (2009.01)
   *H04W 84/18*   (2009.01)
   *H04W 84/04*   (2009.01)
   *H04W 88/10*   (2009.01)

(52) U.S. Cl.
   CPC .......... *H04W 84/045* (2013.01); *H04W 84/18* (2013.01); *H04W 88/10* (2013.01); *H04W 88/12* (2013.01)

(58) Field of Classification Search
   USPC ........................................................ 455/449
   See application file for complete search history.

(56) References Cited

U.S. PATENT DOCUMENTS

| | | | |
|---|---|---|---|
| 9,544,761 B2 | 1/2017 | Nama et al. | |
| 2008/0200202 A1 | 8/2008 | Montojo et al. | |
| 2010/0034135 A1 | 2/2010 | Kim et al. | |
| 2011/0170517 A1 | 7/2011 | Bakker et al. | |
| 2011/0194630 A1 | 8/2011 | Yang et al. | |
| 2011/0244869 A1 | 10/2011 | Olofsson et al. | |
| 2012/0140660 A1 | 6/2012 | Kang et al. | |
| 2012/0176996 A1 | 7/2012 | Kim et al. | |
| 2013/0203350 A1 | 8/2013 | Etchegoyen et al. | |
| 2014/0010171 A1 | 1/2014 | Morrill et al. | |
| 2014/0066055 A1 | 3/2014 | Balakrishnan et al. | |
| 2014/0126438 A1 | 5/2014 | Zhu et al. | |
| 2014/0211690 A1* | 7/2014 | Nama | H04W 8/26 370/328 |
| 2014/0301371 A1 | 10/2014 | Maeda et al. | |
| 2015/0011219 A1 | 1/2015 | Sally et al. | |
| 2015/0373628 A1* | 12/2015 | Hwang | H04W 48/16 370/338 |
| 2016/0014626 A1* | 1/2016 | Yi | H04W 76/10 370/252 |
| 2016/0037406 A1* | 2/2016 | Centonza | H04W 36/04 370/332 |
| 2016/0190707 A1* | 6/2016 | Park | H01Q 1/246 370/334 |
| 2016/0205534 A1 | 7/2016 | Fujishiro et al. | |
| 2016/0212624 A1* | 7/2016 | Mueck | G06F 17/30545 |
| 2016/0286449 A1* | 9/2016 | Choi | H04W 36/28 |
| 2016/0295613 A1* | 10/2016 | Wager | H04L 41/0813 |
| 2017/0070312 A1 | 3/2017 | Yi et al. | |
| 2017/0188241 A1* | 6/2017 | Mueck | H04W 16/14 |
| 2017/0195887 A1* | 7/2017 | Jovancevic | H04W 16/14 |
| 2017/0208454 A1* | 7/2017 | Knisely | H04W 8/22 |
| 2017/0289960 A1 | 10/2017 | Moustafa et al. | |
| 2017/0295497 A1* | 10/2017 | MacMullan | H04W 16/14 |
| 2017/0318470 A1* | 11/2017 | Srikanteswara | H04W 16/14 |
| 2017/0331447 A1 | 11/2017 | Lee et al. | |
| 2018/0054237 A1 | 2/2018 | Tseng et al. | |
| 2018/0132111 A1* | 5/2018 | Mueck | H04W 16/14 |
| 2018/0146380 A1* | 5/2018 | Srikanteswara | H04W 16/14 |
| 2018/0270721 A1* | 9/2018 | Cui | H04L 5/001 |

OTHER PUBLICATIONS

Non-Final Office Action for U.S. Appl. No. 13/752,358, dated Jan. 15, 2015, 21 pages.
Non-Final Office Action for U.S. Appl. No. 13/752,358, dated Jul. 29, 2015, 30 pages.
Final Office Action for U.S. Appl. No. 13/752,358, dated Mar. 31, 2016, 21 pages.
Notice of Allowance and Examiner-Initiated Interview Summary for U.S. Appl. No. 13/752,358, dated Aug. 31, 2016, 11 pages.
Author Unknown, "Technical Specification Group Radio Access Network; Evolved Universal Terrestrial Radio Access (E-UTRA); Radio Resource Control (RRC); Protocol specification (Release 14)," Technical Specification 36.331, Version 14.3.0, Jun. 2017, 3GPP Organizational Partners, 745 pages.
Non-Final Office Action for U.S. Appl. No. 15/815,248, dated Sep. 7, 2018, 12 pages.
Non-Final Office Action for U.S. Appl. No. 15/815,248, dated Mar. 26, 2019, 14 pages.
Final Office Action for U.S. Appl. No. 15/815,248, dated Sep. 19, 2019, 15 pages.

* cited by examiner

CONVENTIONAL SMALL CELL RAN

SYSTEM AND METHOD FOR CITIZENS BAND RADIO SPECTRUM (CBRS) DUAL CELL RADIO NODE

CROSS-REFERENCE TO RELATED APPLICATIONS

This application claims benefit of priority of U.S. Provisional Application No. 62/369,342, filed Aug. 1, 2016, entitled SYSTEM AND METHOD FOR CBRS DUAL CELL RADIO NODE, owned by the assignee of the present application and incorporated by reference herein in its entirety.

FIELD

The invention relates to the provisioning of wireless capacity using the citizens band radio spectrum (CBRS).

BACKGROUND

Operators of mobile systems, such as Universal Mobile Telecommunications Systems (UMTS) and its offspring including LTE (Long Term Evolution) and LTE-Advanced, are increasingly relying on wireless small cell radio access networks (RANs) in order to deploy indoor voice and data services to enterprises and other customers. Such small cell RANs typically utilize multiple-access technologies capable of supporting communications with multiple users using radio frequency (RF) signals and sharing available system resources such as bandwidth and transmit power. While such small cell RANs operate satisfactorily in many applications, there exists a need for further improvements in small cell RAN technologies.

One such improvement includes use of the citizens band radio spectrum. The citizens broadband radio spectrum is a band now used primarily by Navy radars in coastal areas as well as PtP WiMax links at 25,000 locations. As diagrammed in FIG. 1, the FCC is opening 15 10 MHz unpaired channels for CBS devices, a device being termed a CBSD, the same referring to a citizens broadband radio service, which is essentially a fixed location base station. A new Spectrum Access System (SAS) will control access to the band for CBSDs, and the SAS will likely be implemented by a few large players, e.g., Google, under the FCC's oversight.

The new SAS will control access to the band according to various priorities and devices need to be authorized by the SAS for radiating in the allocated spectrum. Having first priority are the incumbent users, e.g., the Navy, PtP links, and so on. The second priority will be CBSDs operating with priority access licenses (these are generally three-year licenses per census tract, but are renewable).

The third priority will be CBSDs operating according to a Generic Authorized Access (GAA) model, which is based on a license-by-rule framework.

In more detail, and referring to FIG. 2, the overall 150 MHz spectrum is currently divided into a lower 100 MHz section and an upper 50 MHz section, with the lower 100 MHz being used by Navy radars in coastal areas and space-to-earth FSS stations. The upper 50 MHz is currently used by fixed wireless BB service, three ground radar stations, 86 grandfathered FSS space-to-earth stations, and Navy radar for ships located further than 44 miles from the coast.

In the new system, the 150 MHz band will be channeled into the noted 15 unpaired 10 MHz blocks (see FIG. 3):

The lower 100 MHz will operate according to the noted three tier model, and the upper 50 MHz will operate according to a two-tier model.

Lower 100 MHz:
Tier 1: Incumbents (Navy radars and FSS Space-to-Earth stations)
Tier 2: CBRS Priority Access Licensees (PAL)
Tier 3: CBRS Generic Authorized Access (GAA)
Upper 50 MHz:
Tier 1: Incumbents (mainly PtP Fixed WiMax links @ 25,000 known locations)
Tier 2: CBRS GAA (after a transition period (~5 yrs), one model will apply, and incumbents will re-classified as GAA)

The SAS will detect activity by incumbents, e.g., Navy radars, and will operate so as to push down to the CBSD information about such activity so as to allow dynamic allocation in a way to vacate channels needed for incumbent use. That is, the SAS is responsible for installing sensors so as to allow an environment sensing capability (ESC). An implementation of the SAS would be by one or more servers operating, e.g., as a cloud service, with an appropriate domain.

The priority access licenses (PAL) will operate as follows. Such are only available for the lower 100 MHz band (see figure above), and will be allocated per census tract. It is noted in this regard that approximately 74,000 census tracts are in the US, and the design targets an optimal population of 4000 for each tract. There will be a maximum of seven PAL licenses given for any census tract (only seven, such that the SAS can dynamically adjust channel usage if needed, e.g., if an incumbent is detected). One licensee can have at most 4 PAL licenses or channels in any given census tract.

PAL licensing will be by a competitive bidding process every three years, with an automatic expiration after that time. For the very first licensing period, a PAL license may be acquired for 3+3 years. All PAL licenses will expire at the same time, so all PAL's will be re-auctioned every three years.

PAL licenses to a tract will be awarded only if there are more bidders than available PAL channels. Otherwise, no PAL licenses will be awarded, and all channels will be available as GAA.

GAA may potentially apply for the whole 150 MHz band, i.e., up to 15 channels. A "license by rule" framework will be applied, where the premises owner has de facto control of on-site deployments. As stated by the FCC, there may be limited opportunities for citizens broadband radio service users to deploy and utilize CBSDs in indoor areas without the permission of facility owners. In addition, an SAS can authorize GAA devices into PAL channels that are not used.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to present principles provide ways to use the CBRS in advantageous ways, particularly in the applications of radio access networks.

In a first aspect, the invention is directed towards a method of operating radio nodes, the method including the steps of: a. configuring each of the radio nodes with dual identities, a first identity of the dual identities being a primary cell identity, a second identity of the dual identities being a secondary cell identity; b. operating the primary cell identity to provide a stable coverage layer; and c. operating the secondary cell identity to provide a dynamic capacity layer.

Implementations of the invention may include one or more of the following. The operating the primary cell identity may use one or more PAL channels. The operating the secondary cell identity may use one or more GAA channels. The method of operating radio nodes may operate the radio nodes within a citizens broadband radio service. The operating the primary cell identity may use one or more PAL channels, and the operating the secondary cell identity may use one or more GAA channels, the one or more GAA channels selected from channels not allocated to the primary cell identity. The primary cell using PAL may be protected from interference from the secondary cell using GAA. The method may further include associating a services node with the radio nodes, where the services node provides a self organizing network functionality for the radio nodes. The self organizing network functionality may provide an optimized allocation of GAA channels provided by SAS across the radio nodes. The method of operating radio nodes may operate the radio nodes within a citizens broadband radio service, and may further include associating a services node with the radio nodes, where the services node acts as a domain proxy for the citizens band radio service. The radio nodes may act as CBSDs.

In a second aspect, the invention is directed towards a radio node for use within a plurality of radio nodes, the radio nodes organized by a services node, the services node providing a self organizing functionality for the radio nodes, the radio node configured to have dual identities, a first identity of the dual identities being a primary cell identity, a second identity of the dual identities being a secondary cell identity, such that the primary cell identity is configured to provide a stable coverage layer, and the secondary cell identity is configured to provide a dynamic capacity layer.

Implementations of the invention may include one or more of the following. The primary cell identity may use one or more PAL channels. The secondary cell identity may use one or more GAA channels. The radio nodes may be may use part of a citizens broadband radio service. The primary cell identity uses one or more PAL channels, and the secondary cell identity may use one or more GAA channels, the one or more GAA channels selected from channels not allocated to the primary cell identity. The primary cell using PAL may be protected from interference from the secondary cell using GAA. The method may further include a services node configured to provide a self organizing network functionality for the radio nodes. The self organizing network functionality may provide an optimized allocation of GAA channels provided by SAS across the radio nodes. The radio nodes may be configured to operate within a citizens broadband radio service, and may further include a services node providing a self organizing network functionality for the radio nodes, where the services node is a domain proxy for the citizens band radio service. The radio nodes may be configured as CBSDs.

Advantages of the invention may include, in certain embodiments, one or more of the following. The PCell using PAL has guaranteed interference protection from GAA users by the SAS. The PCell using PAL is less likely to change, and may be modified only in response to incumbent users and not in response to GAA users. The PCell provides a steady robust coverage layer for UEs. The SCell uses GAA channels that change more frequently than PAL, but without interrupting PCell connectivity. Other advantages will be understood from this description.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Like reference numerals indicate like elements in the drawings. Elements are not drawn to scale unless otherwise indicated.

DESCRIPTION

Systems and methods according to implementations of principles disclosed here provide an LTE E-RAN employing a hierarchical architecture with a central controller or coordinator controlling multiple LTE radio nodes (RNs). The central controller or coordinator may form a portion of a services node (SN) in communication with RNs that service user equipment or UEs. These RNs may be configured as individual cells (i.e, with different physical cell identities (PCIs)) within the small cell network. Details of these systems are described below with respect to FIG. 6 et seq.

This architecture may be advantageously employed within the context of CBRS as follows. The SN may act as a domain proxy for the CBRS, and may provide centralized SON (self-organizing network) functionality. The SN as the domain proxy may have a single SAS interface for multiple RNs, where the RNs act as the CBSDs. Centralized SON allows an optimized allocation of GAA channels provided by SAS across RNs. That is, given a set of channels, the centralized SON can determine the best allocation given a current network situation.

In one implementation, and as described below in connection with FIGS. 4A and 4B, an RN may act with a dual cell shared radio spectrum. They are "dual" in the sense that each radio node operates two cells co-located in geographic space, a primary cell and a secondary cell. They are "shared" in the sense that multiple operators may use the same radio node.

Figure 4B:
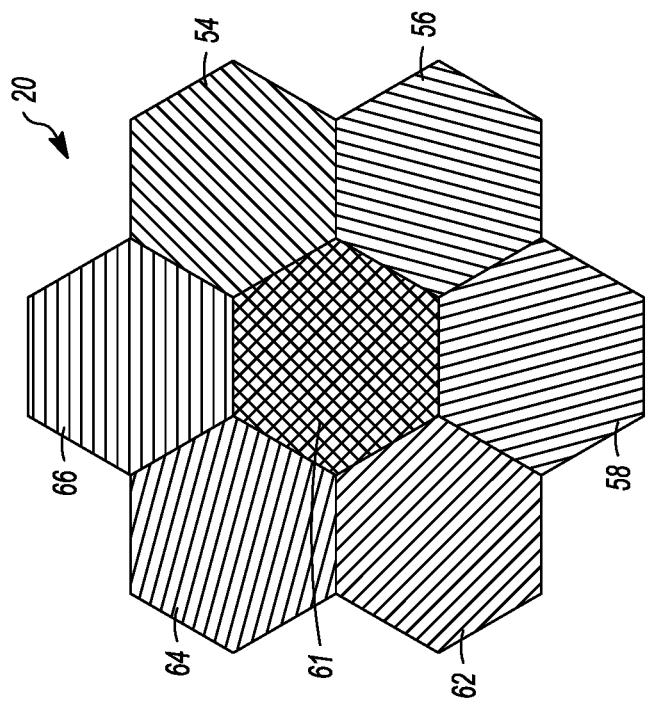
FIGS. 4A and 4B depict one exemplary arrangement of primary and secondary cells.
Figure 4A:
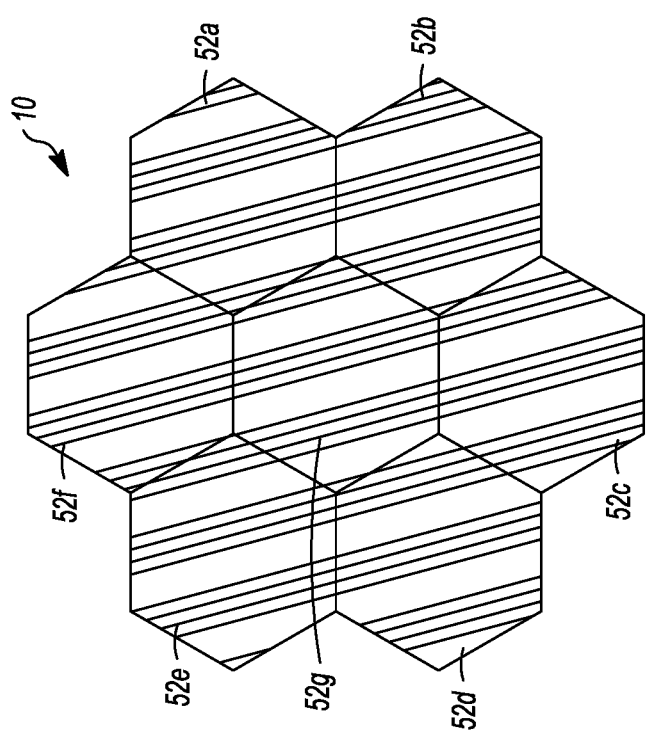
Figure 5B:
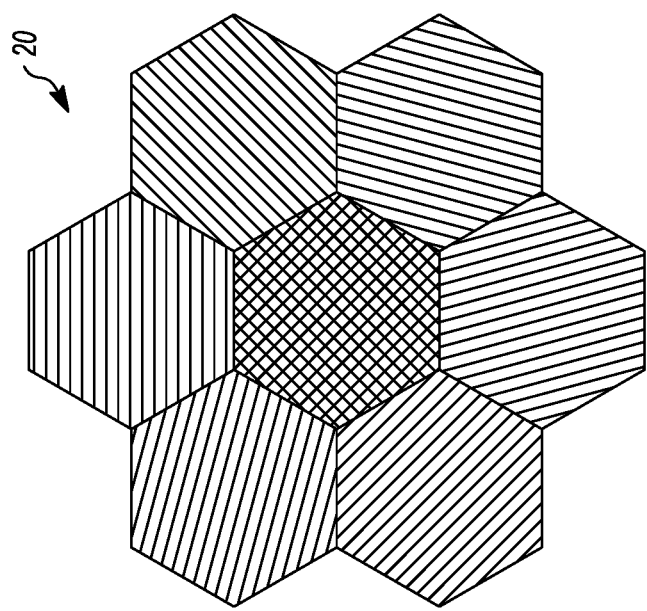
FIGS. 5A and 5B depict another exemplary arrangement of primary and secondary cells.
Figure 5A:
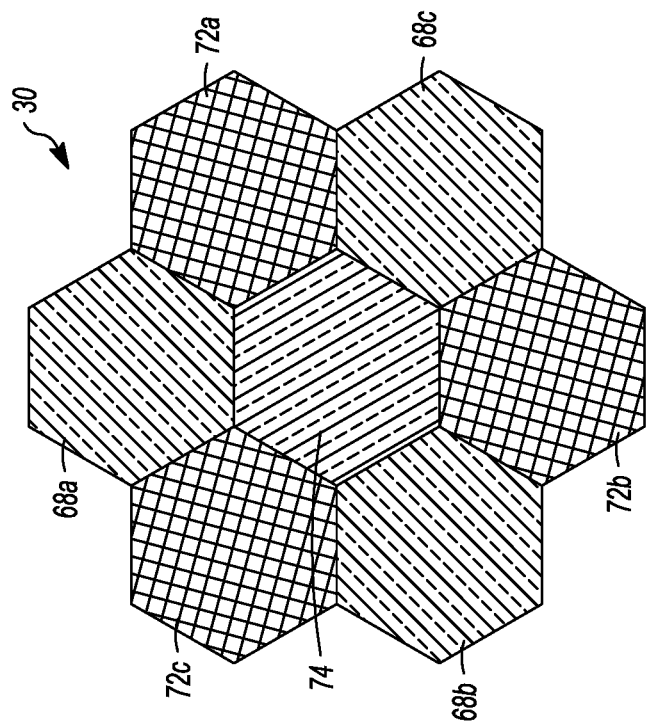

In FIGS. 4A and 4B, it is seen that the set 10 of primary cells (PCell) 52a-52g use a common or the same PAL channel (and it could operate on the same channel across all the radio nodes, in one implementation), and the set 20 of secondary cells (SCell) use multiple GAA channels 58-66. In FIGS. 5A and 5B, which is a variation, the set 30 of primary cells use three PAL channels 68abc, 72abc, and 74. The secondary cells are as above with respect to FIG. 4B.

In the implementations of FIGS. 4A, 4B, 5A, and 5B, each RN has a PCell and an SCell operating at the same time. They are localized and occupy the same geographic location, but operate at different frequencies/channels. The PCell may encompass, e.g., one or more channels, e.g., 20 MHz, and the same can act as a coverage layer, providing a stable spectrum for communications, as these channels do not change. The SCell operates at the same time, and can operate with higher reuse using multiple GAA channels as they are available (their availability may vary as they are dynamically allocated). This layer can act as a "capacity" layer as the multiple GAA channels can allow for high throughput when needed. That is, they are dynamically allocated, but high capacity can be enabled as a high number of such channels may be available at any one time.

The below description discusses a particular implementation of a services node as described above, as well as one way in which dual cell identities may be implemented.

Figure 6:
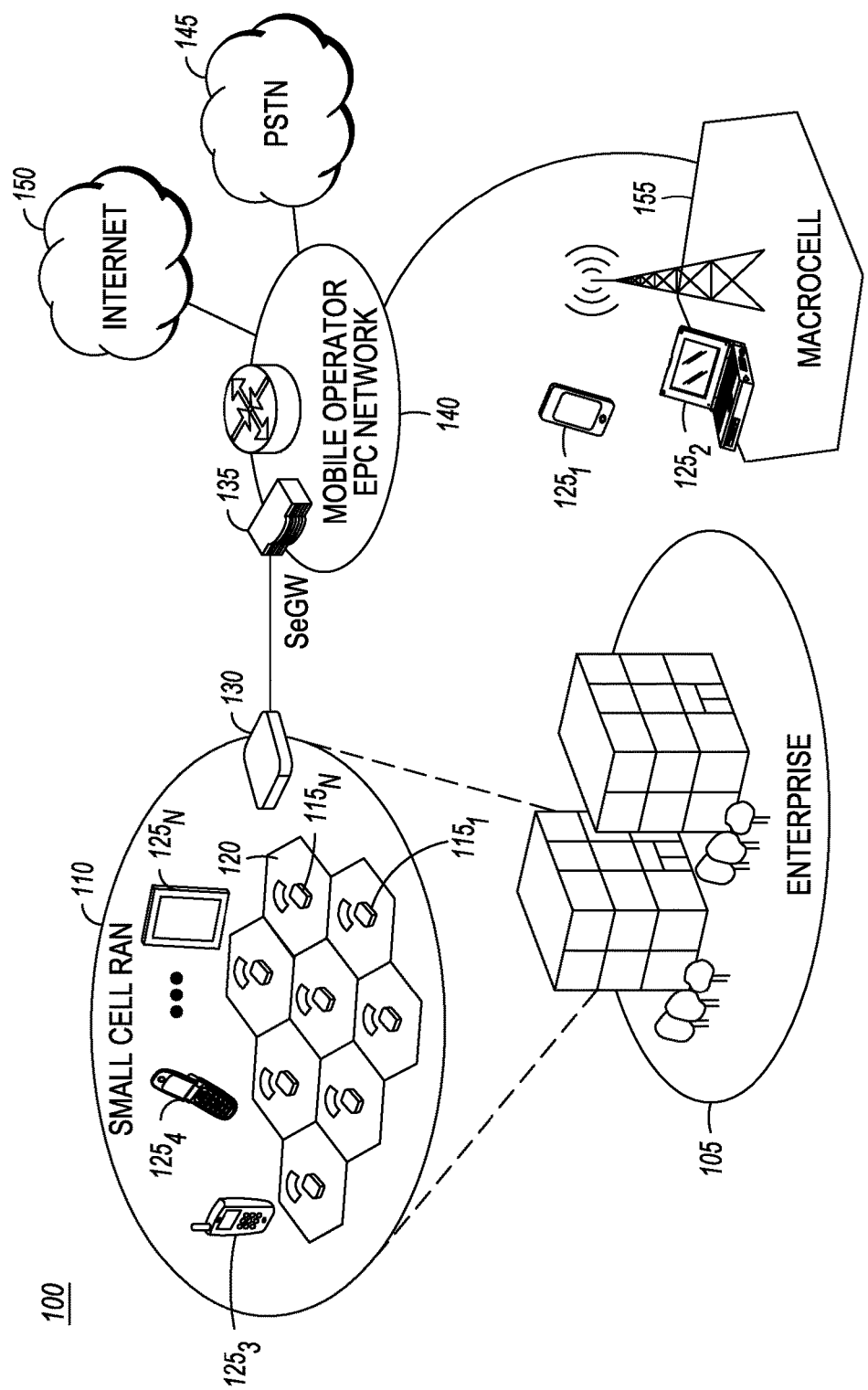
FIG. 6 shows an illustrative mobile telecommunications environment in which the systems and methods according to present principles may be utilized.

FIG. 6 shows an illustrative mobile telecommunications environment 100 in which the present arrangement may be practiced. The mobile telecommunications environment 100, in this illustrative example, is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the present principles described herein may also be applicable to other network types and protocols. The environment 100 includes an enterprise 105 in which a small cell RAN 110 is implemented. The small cell RAN 110 includes a plurality of radio nodes (RNs) $115_1 \ldots _N$. Each radio node 115 has a radio coverage area (graphically depicted in the drawings as a hexagonal shape) that is commonly termed a small cell. A small cell may also be referred to as a femtocell, or using terminology defined by 3GPP as a Home Evolved Node B (HeNB). In the description that follows, the term "cell" typically means the combination of a radio node and its radio coverage area unless otherwise indicated. A representative cell is indicated by reference numeral 120 in FIG. 6.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as "user equipment" (UE) and indicated by reference numerals $125_{1-N}$ in FIG. 6). However, the foregoing is intended to be illustrative and the solutions described herein can be typically expected to be readily scalable either upwards or downwards as the needs of a particular usage scenario demand.

In this particular illustrative example, the small cell RAN 110 includes one or more services nodes (represented as a single services node 130 in FIG. 1) that manage and control the radio nodes 115. In alternative implementations, the management and control functionality may be incorporated into a radio node, distributed among nodes, or implemented remotely (i.e., using infrastructure external to the small cell RAN 110). The radio nodes 115 are coupled to the services node 130 over a direct or local area network (LAN) connection (not shown in FIG. 6) typically using secure IPsec tunnels. The services node 130 aggregates voice and data traffic from the radio nodes 115 and provides connectivity over an IPsec tunnel to a security gateway SeGW 135 in an Evolved Packet Core (EPC) 140 network of a mobile operator. The EPC 140 is typically configured to communicate with a public switched telephone network (PSTN) 145 to carry circuit-switched traffic, as well as for communicating with an external packet-switched network such as the Internet 150.

Figure 1:
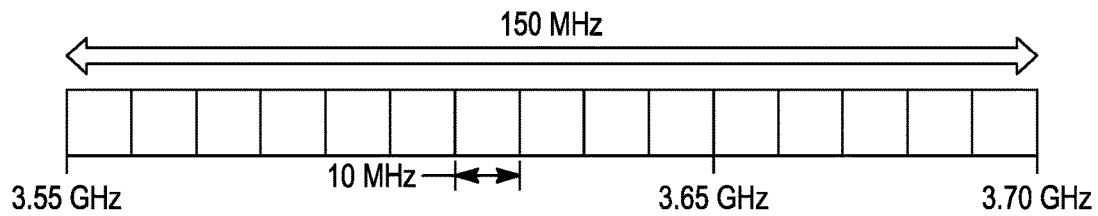
FIGS. 1-3 depict prior art spectrum allocation schemes.
Figure 2:
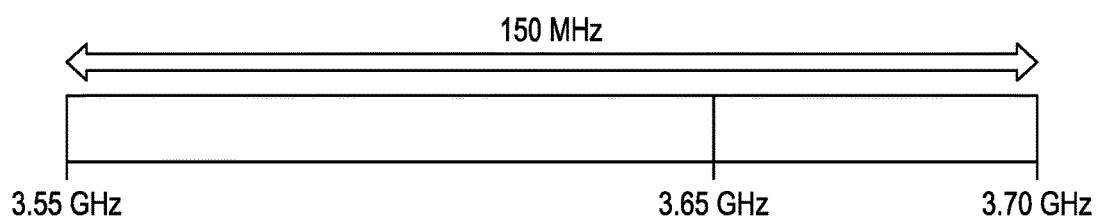
Figure 3:
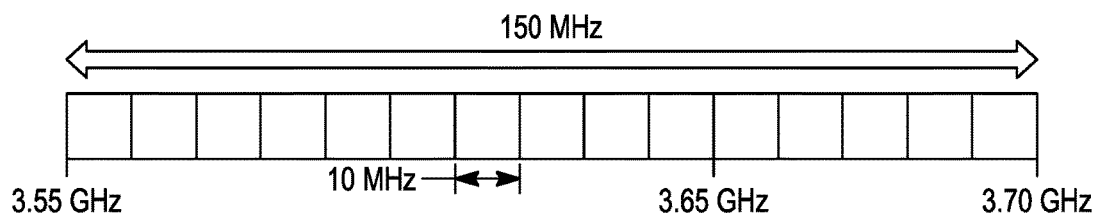

The environment 100 also generally includes Evolved Node B (eNB) base stations, or "macrocells", as representatively indicated by reference numeral 155 in FIG. 1. The radio coverage area of the macrocell 155 is typically much larger than that of a small cell where the extent of coverage often depends on the base station configuration and surrounding geography. Thus, a given UE 125 may achieve connectivity to the network 140 through either a macrocell or small cell in the environment 100.

Figure 7:
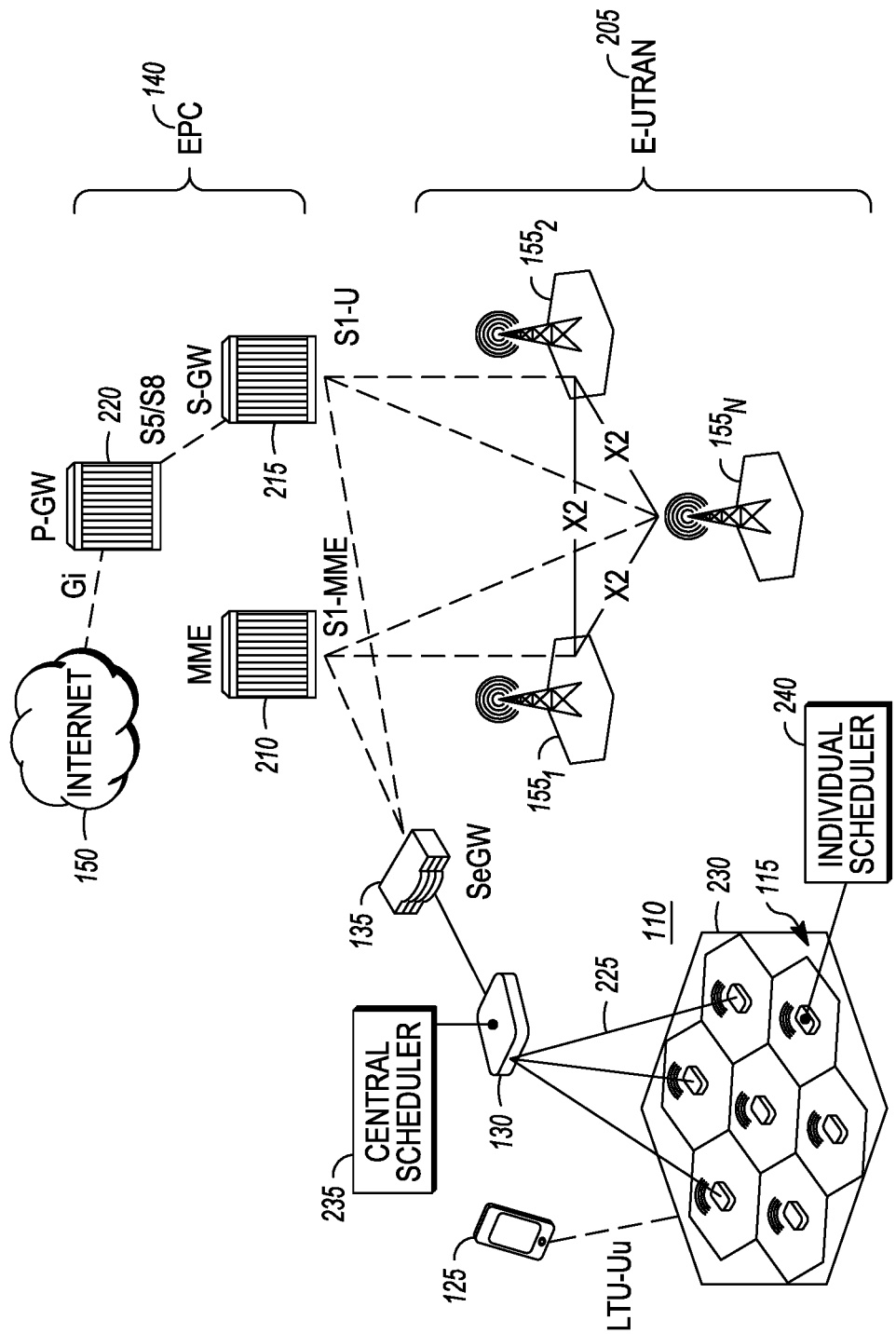
FIG. 7 shows details of an EPC (Evolved Packet Core) and E-UTRAN (Evolved UMTS Terrestrial Radio Access Network where UMTS is an acronym for Universal Mobile Telecommunications System) arranged under LTE (Long Term Evolution) with which a small cell network may interoperate.

Along with macrocells 155, the small cell RAN 110 forms an access network, i.e., an Evolved UMTS Terrestrial Radio Access Network (E-UTRAN) under 3GPP as represented by reference numeral 205 in FIG. 7. As shown, there is no centralized controller in the E-UTRAN 205, hence an LTE network architecture is commonly said to be "flat." The macrocells 155 are typically interconnected using an X2 interface and connected to the EPC 140 by means of an S1 interface. More particularly, the macrocells are connected to the MME (Mobility Management Entity) 210 in the EPC 140 using an S1-MME interface and to the S-GW (Serving Gateway) 215 using an S1-U interface. An S5 interface couples the S-GW 215 to a P-GW (Packet Data Network Gateway) 220 in the EPC 140 to provide the UE 125 with connectivity to the Internet 150. A UE 125 connects to the radio nodes 115 over an LTE-Uu interface.

The SeGW 135 is also connected to the MME 210 and S-GW 215 in the EPC 140 using the appropriate S1 connections. Accordingly, as each of the radio nodes 115 in the small cell RAN 110 is operatively coupled to the services node 130 (as representatively shown by lines 225), the connections from the radio nodes 115 are aggregated to the EPC 140. Such aggregation preserves the flat characteristics of the LTE network while reducing the number of S1 connections that would otherwise be presented to the EPC 140. The small cell RAN 110 thus essentially appears as a single eNB 230 to the EPC 140, as shown.

The services node includes a central scheduler 235 as shown in FIG. 7. The radio nodes 115 may also be configured to support individual schedulers (representatively indicated by reference numeral 240 in FIG. 7). The operation of the schedulers is discussed in illustrative examples at the text accompanying FIGS. 18, 25 and 26 below.

Figure 8:
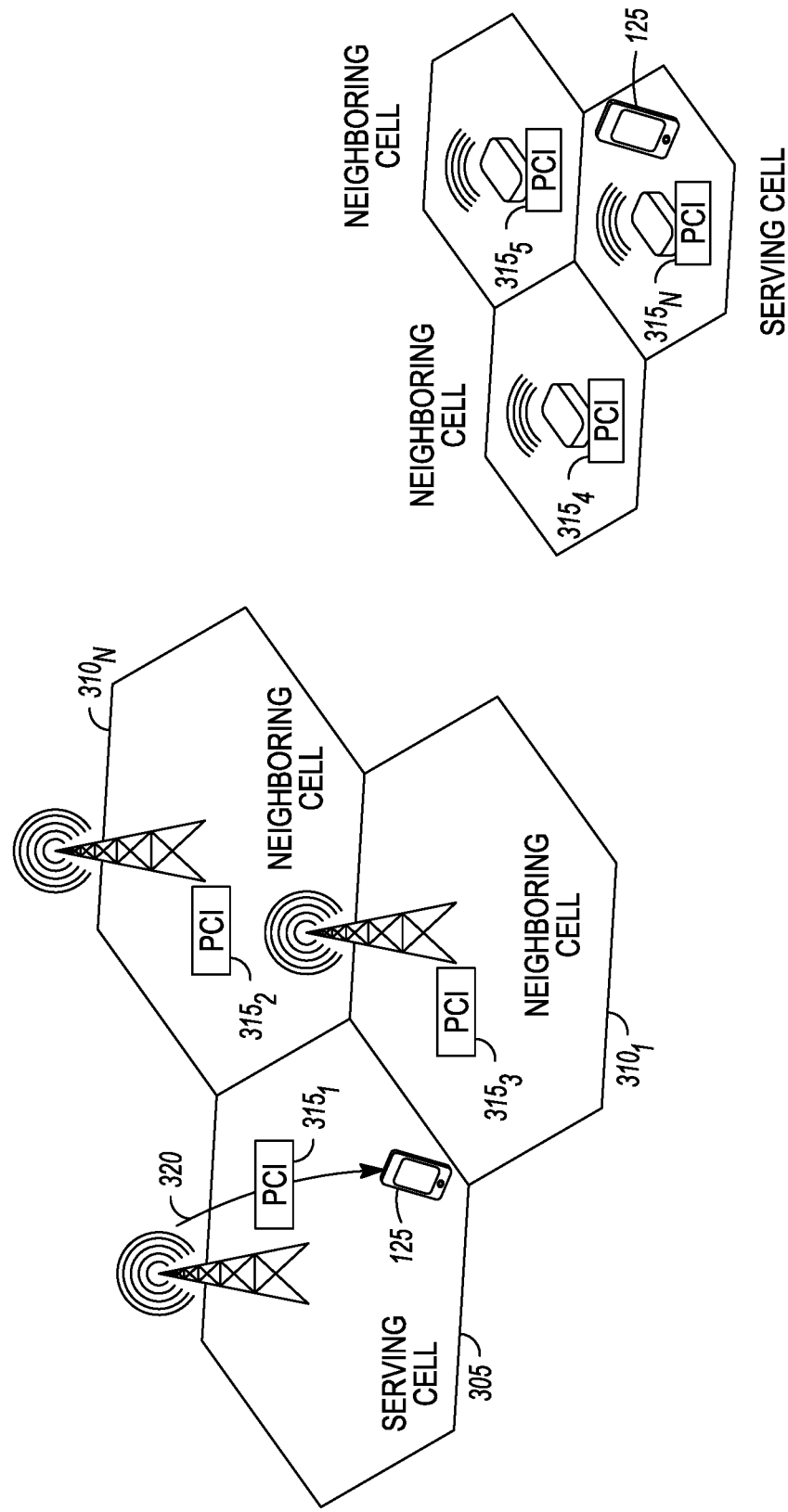
FIG. 8 shows how a PCI is utilized to uniquely identify cells to user equipment (UE) where cells can include a serving cell and neighboring cells.

A UE 125 connected to the LTE network environment 100 will actively or passively monitor an E-UTRAN cell. As shown in FIG. 8, such a cell is termed the "serving cell" 305 and as the UE 125 moves throughout the environment 100, it will continually evaluate the quality of the serving cell as compared with that of neighboring cells 310. As shown, both small cells and macrocells can identify themselves to the UE 125 using a unique Physical Cell Identity (PCI) 315 that is transmitted over a downlink to a UE as representatively indicated by reference numeral 320. Each cell is assigned a physical channel identity (PCI) that allows a UE to distinguish adjacent cells. As such PCIs are uniquely assigned among neighboring cells 310 but can be reused across geographically separated cells.

Figure 9:
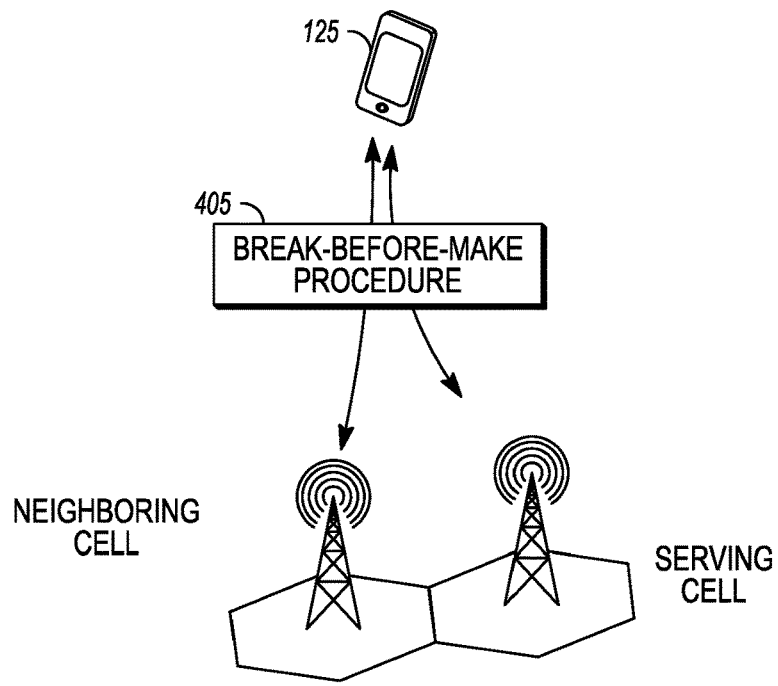
FIGS. 9 and 10 show how a serving cell may be changed under LTE.

As noted above, a significant architectural difference between LTE and UMTS is that the standard LTE E-UTRAN has a flat architecture with multiple eNBs directly connecting to the LTE EPC. Another key difference relates to mobility across cells—LTE does not support Soft Handover (SHO) as in UMTS at a cell-edge and instead uses Hard Handover (HHO). As shown in FIG. 9, the HHO under LTE uses a break-before-make procedure 405 when a UE 125 moves between cells. As data outage may occur in the break-before-make HHO in LTE, some error-sensitive or delay-sensitive users can be negatively affected, for example as in VoIP (Voice over Internet Protocol) calls.

The lack of traditional macro-diversity schemes in LTE at cell-edge can result in poor spectral efficiency and also the potential for a poor handover success rate. For example, poor coordination of transmissions from adjacent eNBs can result in excessive inter-cell interference to cell-edge UEs and may result in handover failures due to poor SIR (Signal-to-Interference Ratio) both in the downlink (DL) and UL (uplink). Communications in indoor environments with low time dispersion (delay-spread) can also experience frequency-flat fading, which can result in loss of entire transmissions. In UMTS, by contrast, SHO enables macro-diversity which reduces the impact of flat fading on one of the links. In addition, in typical small cell FDD (Frequency Division Duplexing) deployments, both due to the lack of DL/UL reciprocity in an FDD system and due to unequal interference seen in DL and UL, it is common to observe an imbalance in the relative signal strengths of different eNBs in the DL and UL. For example, a cell-edge UE may find that Cell A is stronger than Cell B in the DL while Cell B is stronger than Cell A in the UL. Such an imbalance may result in a poor handover success rate but can generally be mitigated with macro-diversity. The impact of poor handover performance can be particularly noticeable in some conventional small cell networks.

Figure 11:
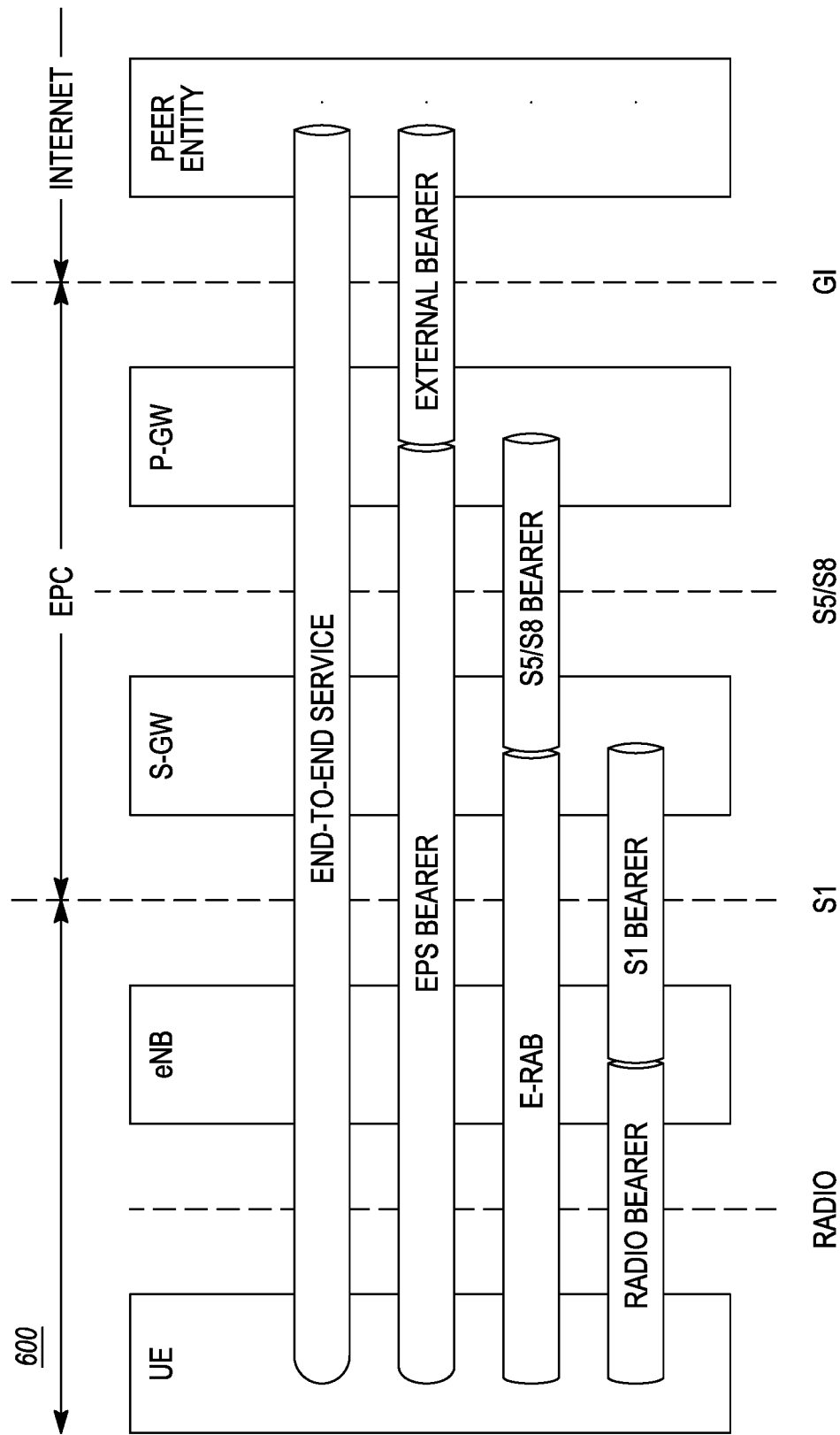
FIG. 11 shows an EPS (Evolved Packet Service) Bearer Service Architecture as described in 3GPP TS36.300.

There are two RRC (Radio Resource Control) states in LTE: RRC_Connected or RRC_Idle. A UE in the RRC_Connected state is referred to here as being either active or inactive depending on whether it has data to be transferred or not. When the UE is in the RRC_Connected state, one EPS (Evolved Packet Switch) bearer/E-RAB (E-UTRAN Radio access bearer) is established when the UE connects to a PDN (packet data network), and it remains established throughout the lifetime of the PDN connection to provide the UE with always-on IP connectivity to that PDN (FIG. 11 shows an EPS bearer service architecture 600 as provided in 3GPP TS36.300). In order to improve the battery life of an inactive UE, a connected mode discontinuous-receive (C-DRX) state is provided in LTE. In this state, a UE only listens to the DL periodically for short durations of time and thus prolongs its battery life.

Figure 10:
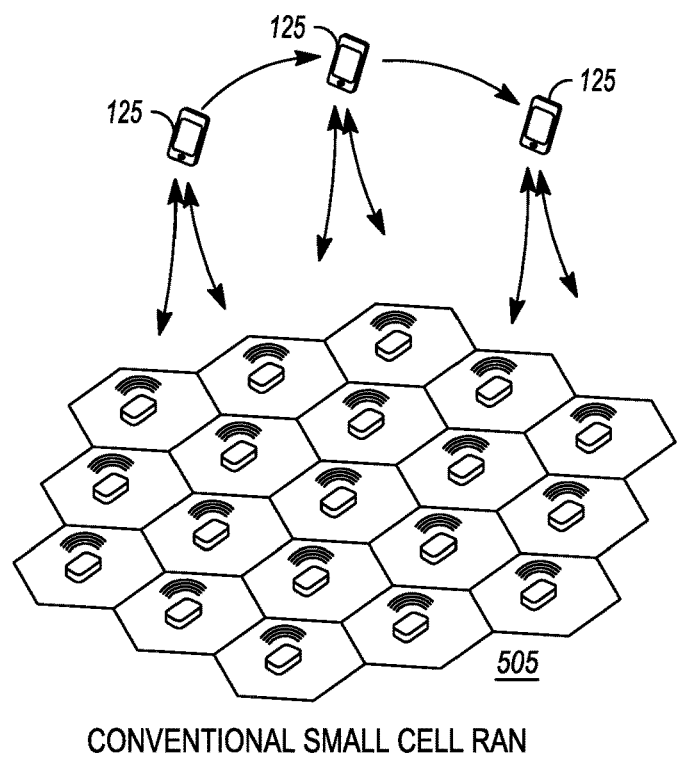

The advantage of keeping a UE in C-DRX state is the much-reduced latency in transferring newly arriving data when compared to a UE in the RRC_Idle state. However, as a UE in the C-DRX state moves within a conventional small cell RAN, it would need to perform a HHO operation for each physical transition from one radio node to another as it traverses the network 505, as shown in FIG. 10. In a typical conventional small cell RAN, the number of such UEs and the number of HHO events for each such UE are expected to be significant. The frequency of handovers and the associated signaling for a UE in C-DRX state would be an unnecessary drain on its battery life even when no data is being transferred but the UE is just moving about within the small cell RAN. As data outage may occur in the break-before-make HHO in LTE, some sensitive UE users such as those using lower data rates can be negatively affected, for example as in VoIP (Voice over Internet Protocol) calls.

Figure 12:
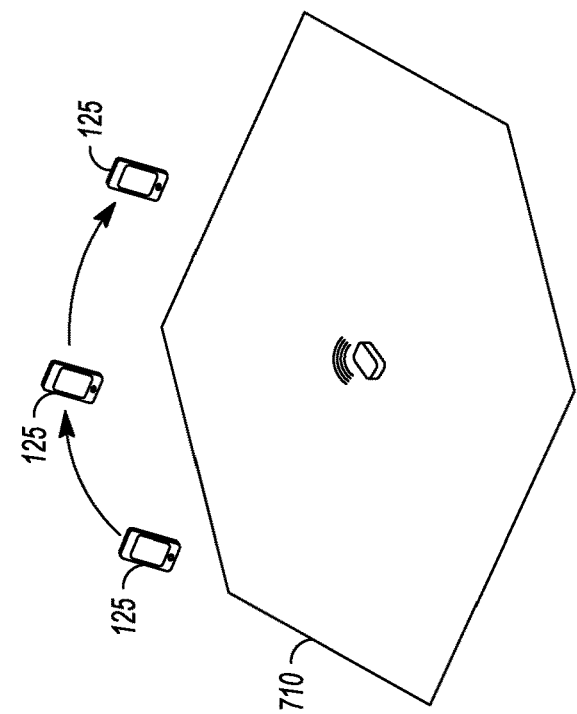
FIG. 12 shows an illustrative arrangement in which radio nodes in a small network are adapted so that the network operates in a way to avoid hard handovers.
Figure 12:
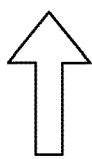
Figure 12:
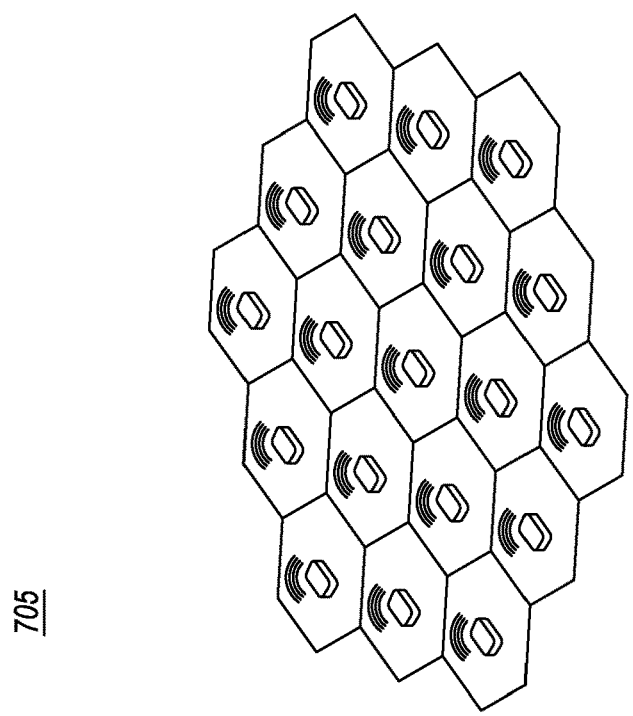
Figure 13:
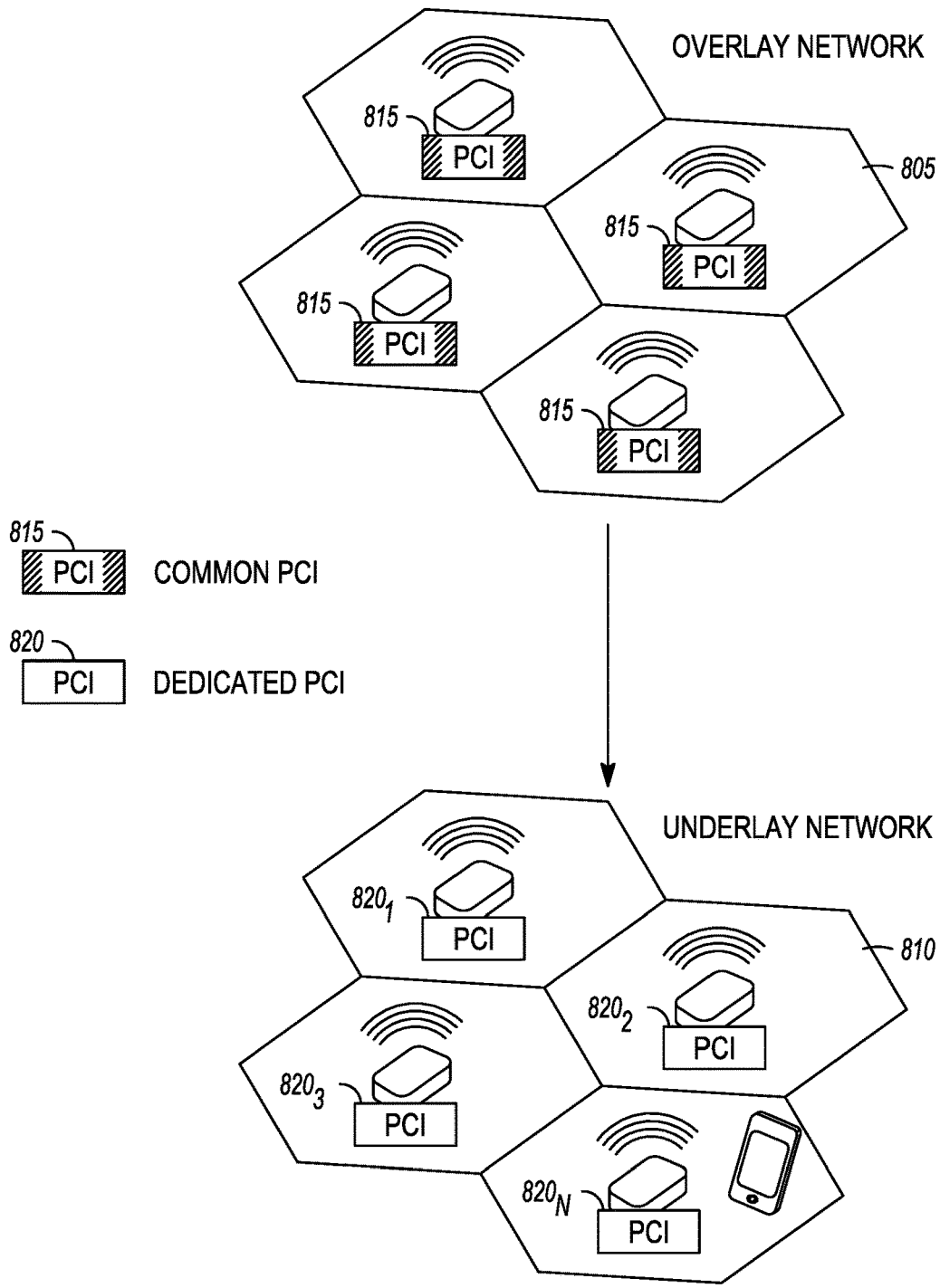
FIGS. 13 and 14 show illustrative overlay and underlay networks using common and dedicated PCIs, respectively.
Figure 14:
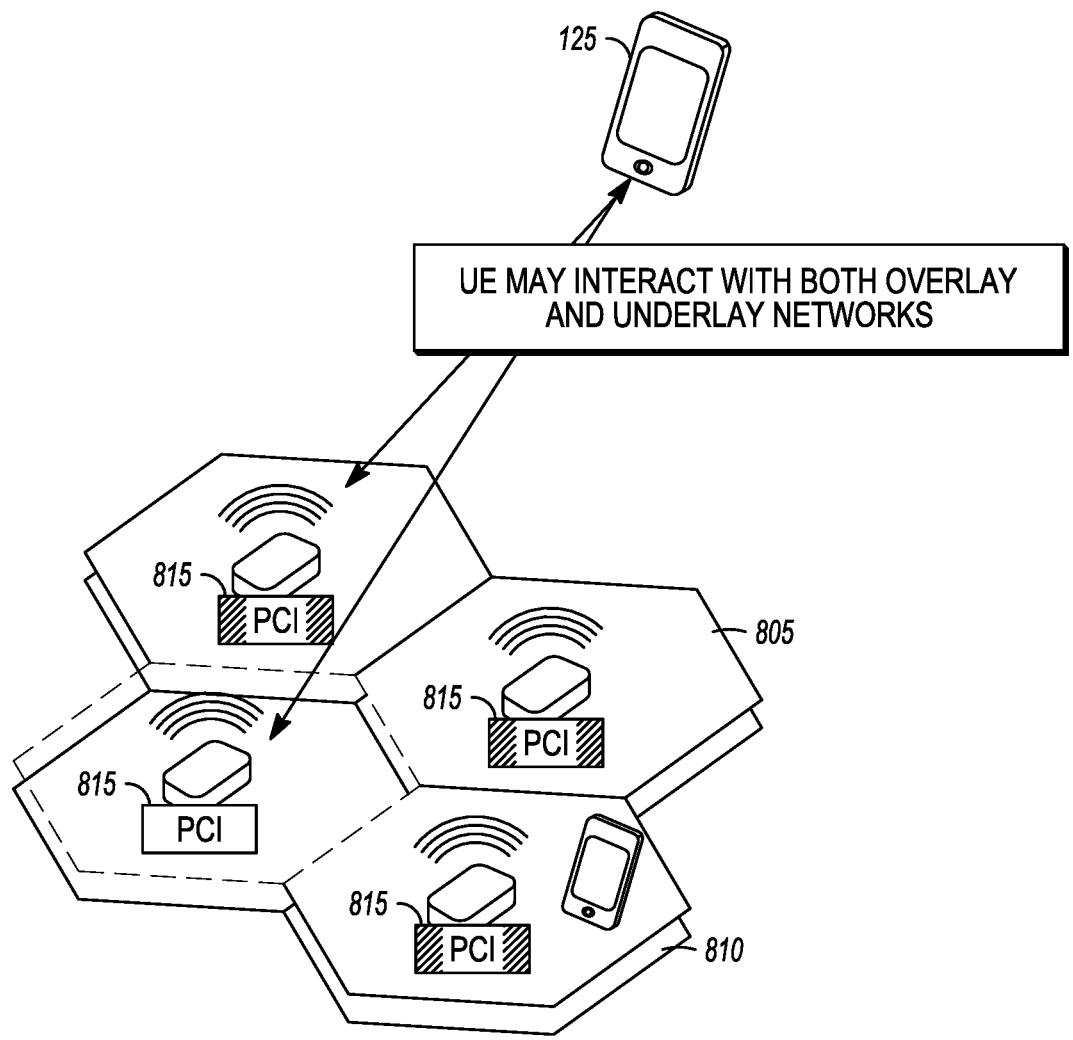

As shown in FIG. 12, in the present common PCI arrangement, multiple neighboring small cells 705 will appear as a single cell 710 to a UE 125. As the UE moves within the effective single cell 710, no HHOs will typically be needed. In an illustrative network architecture 800, two functional layers are utilized including an overlay network 805 and an underlay network 810 as shown in FIG. 13. The overlay network 805 is configured so that the radio nodes can each expose a common PCI 815 to the UEs, while the underlay network exposes dedicated PCIs 820 with which the UE interacts in a conventional manner. A UE 125 can typically be expected to interact with both the overlay network 805 and underlay network 810, as shown in FIG. 14.

Figure 15:
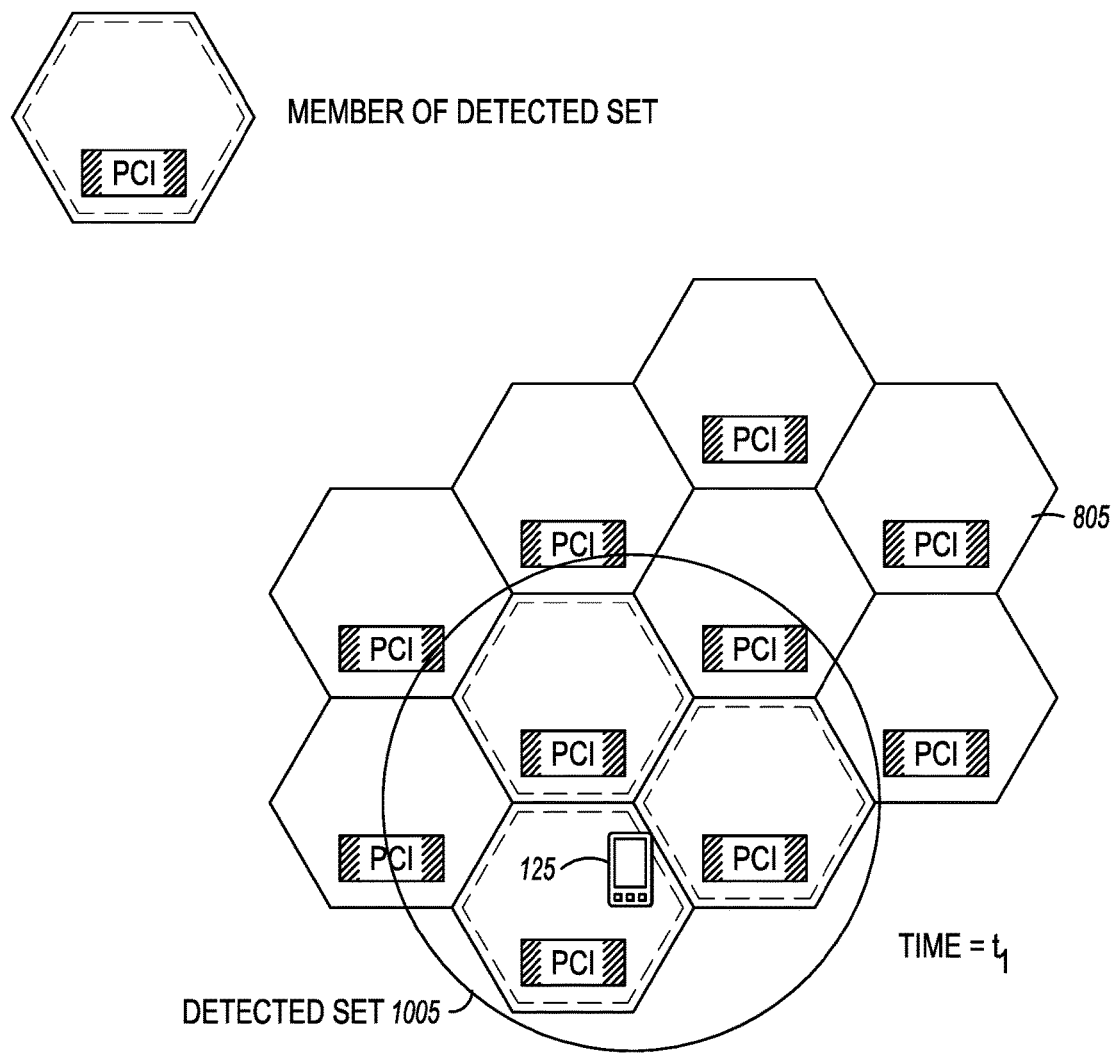
FIGS. 15 and 16 illustratively show how only cells within listening range of a UE are configured with a common PCI.
Figure 16:
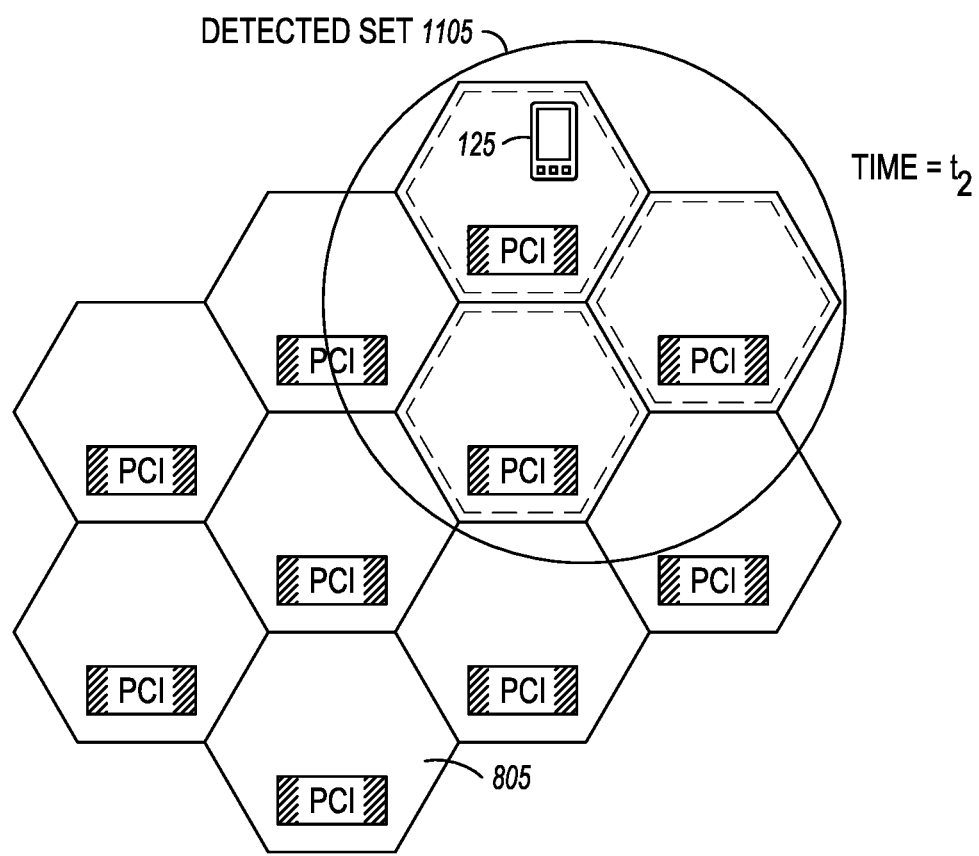

As shown in FIG. 15, only those small cells in the overlay network 805 that are within listening range of a UE 125 (termed the "detected set" here and indicated by reference numeral 1005 in FIG. 15, typically around one to five cells) are configured to transmit the same data and control signals to the UE using the common PCI. As UE 125 traverses the small cell network, the particular cells that make up the detected set will thus change, as indicated by reference numeral 1105 in FIG. 16. In typical implementations every cell in the overlay network 805 will transmit the reference signals and common channels associated with the common PCI at all times. However, only cells in the detected set will commonly transmit shared and dedicated channels transferring user-specific control and data to the UE using the common PCI identities. In an optional alternative implementation, a dual identity cell may be configured so that the common PCI identity and/or dedicated PCI identity are selectively operable, or so as to accomplish the schemes laid out in FIGS. 4A, 4B, 5A, and 5B. For example, the common PCI identity can be turned off on cells that are not part of a detected set for any UE, as illustratively described with the network topology 1400 shown in FIG. 19, and the dedicated PCI identity can be turned off as one illustrative way of implementing the network topology 1800 shown in FIG. 23 and described in the accompanying text.

Figure 17:
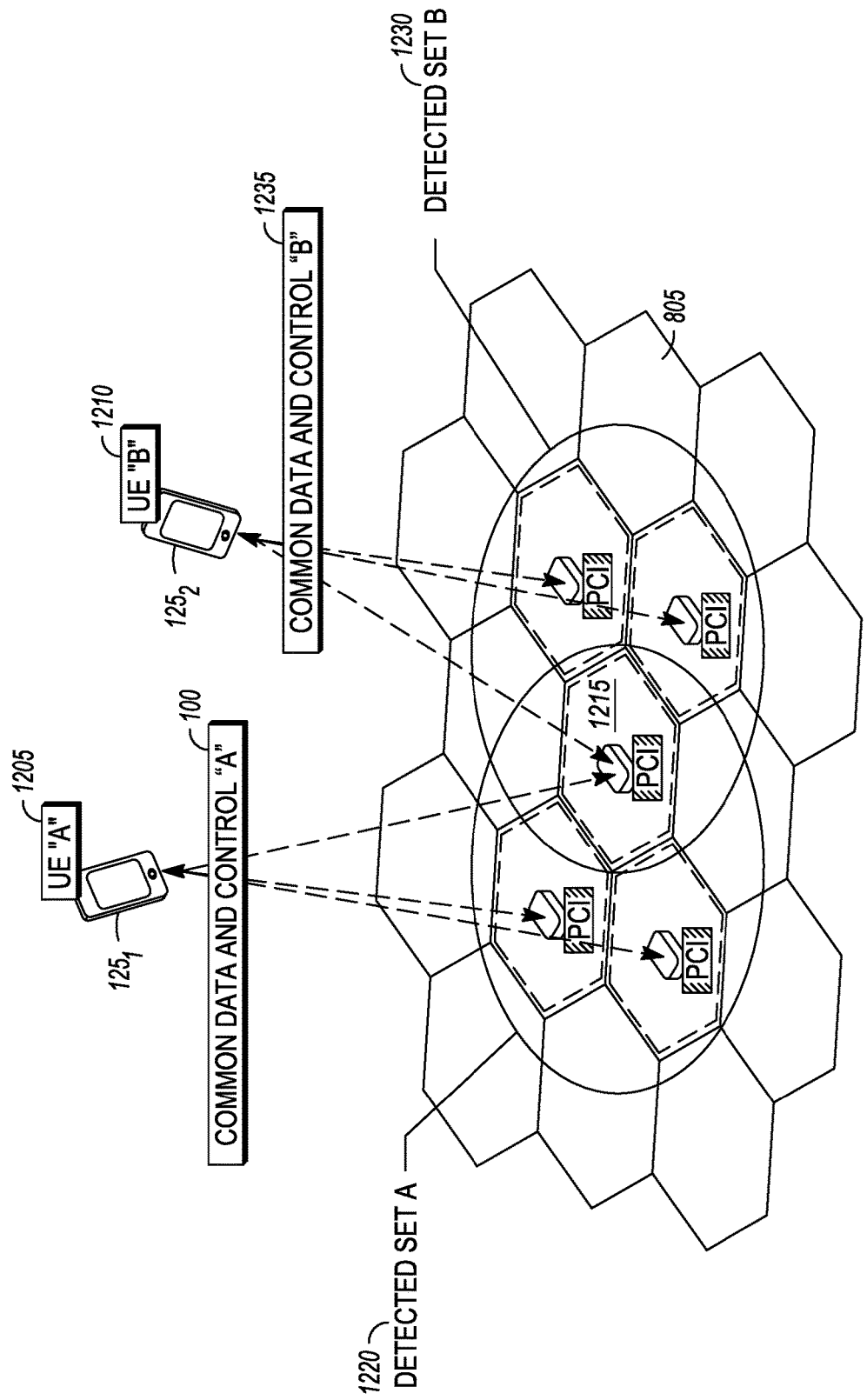
FIG. 17 illustratively shows how common PCI cells transmit the same data and control signals to a UE.

FIG. 17 provides an illustrative example in which respective detected sets transmit data and control signals to individual UEs comprising UE "A" 1205 and UE "B" 1210. Depending on the location of the UEs in the overlay network 805, the detected set of UE "A" may contain all, some, or none of the same cells in the detected set of for UE "B." In the particular example shown in FIG. 17, the detected set 1220 for UE "A" includes one cell 1215 that is shared with the detected set 1230 for UE "B." Each cell in the detected set 1220 transmits common data and control signals "A" 1225 that are intended for UE "A" 1205. And each cell in the detected set 1230 transmits common data and control signals "B" 1235 that are intended for UE "B" 1210. Accordingly, a UE 125 will benefit from macro-diversity for all signals and channels in the DL and UL including common signals/channels and shared or dedicated signals/channels (e.g., synchronization sequences (Primary Synchronization Signal (PSS) and Secondary Synchronization Signal (SSS)), CRS (Cell-specific Reference Signal), PBCH (Physical Broadcast Channel)), PDCCH (Physical Downlink Control Channel), PDSCH (Physical Downlink Shared Channel), etc.).

Both the functional layers of the architecture 800 (FIG. 13) can be advantageously implemented using the same radio node hardware. That is, a single radio node may be configured to have dual, but distinct identities so that it can operate in either or both the overlay network 805 and underlay network 810, or so that it can operate as both a primary cell and as a secondary cell (see FIGS. 4A, 4B, 5A, and 5B). More specifically, as shown in the taxonomy 1300 in FIG. 18, the identities include one that exposes a dedicated PCI 1310 and another that exposes a common PCI 1315. The dedicated PCI identity 1310 is operated to facilitate localization of the UE within the small cell RAN (as indicated by reference numeral 1320), although it may also be operated conventionally to provide communication services to a UE in some cases, as described below. In other words, the dedicated PCI identity 1310 enables the UE to distinguish among cells in the small network since neighboring cells will each use a unique PCI. As such, the dedicated PCI identity may be used to determine which cells should be members of a detected set for a given UE depending on the UE's physical location within the small cell RAN.

Localization may be accomplished by RF measurements received or performed at the radio node (1325) in order to detect adjacent cells having a fixed signal strength offset from the UE's serving cell. For example, the UE can report measurements via RRC MRM (Measurement Report Message) (1330) such as reference signal received power (RSRP) and reference signal received quality (RSRQ). Such reporting may be performed periodically or be event-driven. CQI (Channel Quality Indication) reports from the UE (1335) may also be used separately or in combination with other measurements to assist in localization.

Location information may also be inferred at the radio node using physical layer measurements (1340) such as SRS (Sounding Reference Signal) measurements. In some cases, it may be necessary to determine separate downlink and uplink detected sets for each UE, since downlink and uplink channel conditions may vary significantly. The dedicated PCI identity 1310 may also be configured to operate at lower power than normal, in some implementations as described below, to reduce interference with the common PCI identity 1315 (1345).

As noted above, the common PCI identity 1315 is operated to facilitate macro diversity (1350) for common signals/channels (1355) and for shared physical channels using hybrid joint processing (1360) as described below. The common PCI identity 1315 coordinates with other cells in the detected set so that transmission of the common PCI is performed in a time-synchronized manner (1365). The common PCI identity 1315 may also implement inter-cell interference mitigation techniques (1370) in some implementations. For example the CRS of a dedicated PCI identity may be offset in frequency (1375) from that of the common PCI identity by using different PCIs from the same PCI group. Control channel interference from the common PCI overlay network may be minimized by using the same control region as the dedicated PCI identity but using semi-persistent scheduling for UEs on the common PCI overlay network (1380). Thus, control channels on the dedicated PCI identities would see limited interference from the common PCI identities. RB (Resource Block) allocation for data transfers may then be coordinated between a centralized common PCI overlay network scheduler (e.g., scheduler 235 implemented in the services node 130 shown in FIG. 6 and described in the accompanying text) and the individual schedulers implemented in the dedicated PCI identities in the radio nodes.

Figure 18:
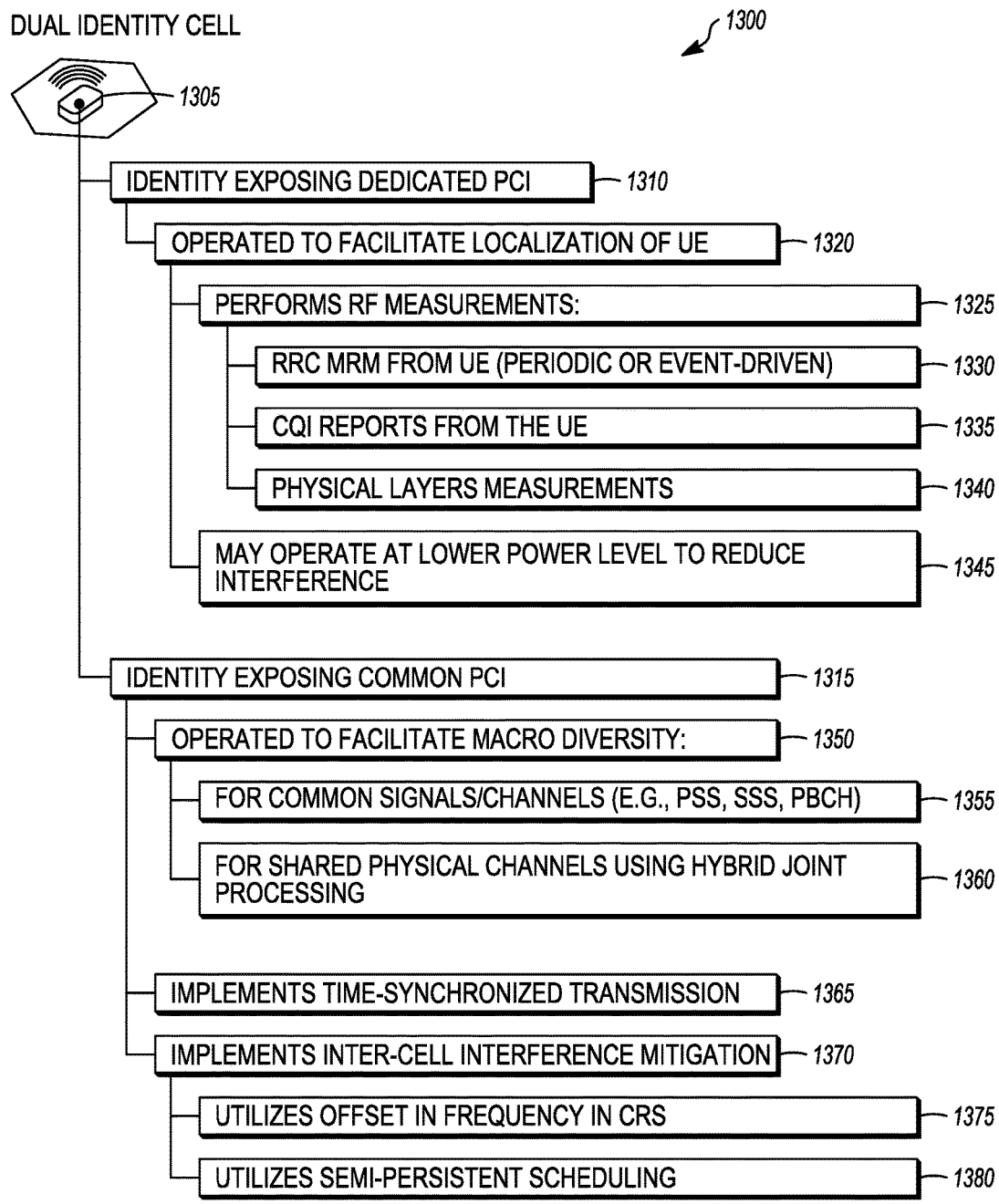
FIG. 18 shows a taxonomy of illustrative features and characteristics which are incorporated into small cells which may be utilized to implement a dual identity cell that can use both a common PCI and dedicated PCI.
Figure 19:
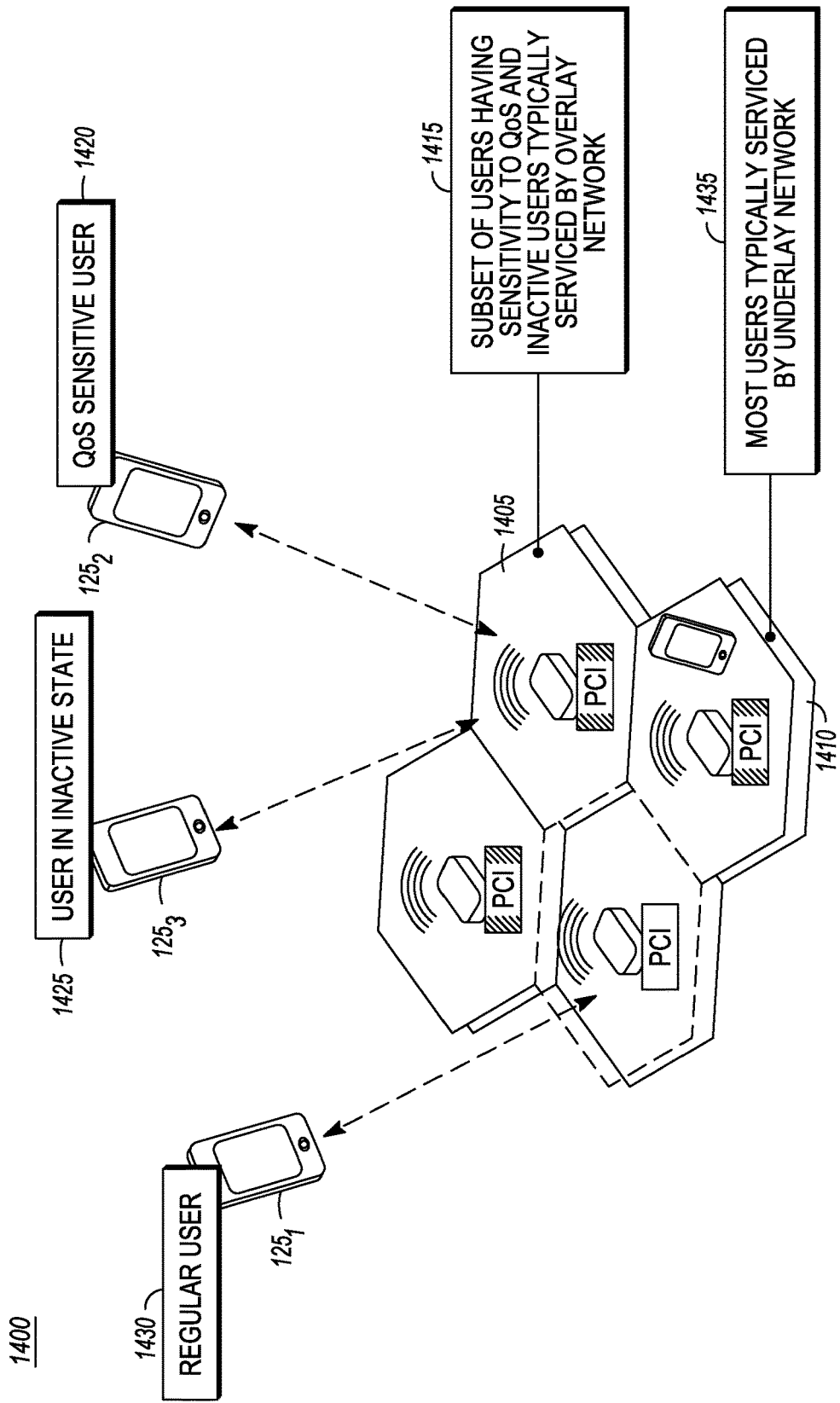
FIG. 19 shows a first illustrative network topology that utilizes dual identity cells.

FIG. 19 shows a first illustrative network topology 1400 that utilizes dual identity cells. In this example, the overlay network 1405 will typically be utilized, as indicated by reference numeral 1415, to service a subset of users 1420 who have particular sensitivity to QoS (Quality of Service), for example low data rate/VoIP users as well as users in an inactive state (1425). Regular users 1430 (i.e., non-sensitive, active users) would remain on the underlay network 1410 using the dedicated PCI identities of the cells, as indicated by reference numeral 1435. Thus, the dedicated identities are used for both localization of UE for purposes of determining the detected set and for providing regular communication services to the UEs of regular users who remain on the underlay network 1410. Since both identities are operated simultaneously to provide communication services to UE in this first network topology, some inter-cell interference between identities can typically be expected. In this case, some of the interference mitigation techniques 1370 (FIG. 18) described above may be appropriately utilized.

As noted above, the network topology 1400 may be optionally configured to selectively operate the common PCI identity of cells in the overlay network 1405. For example, the reference signals and common channels associated with the common PCI may be localized so that they are not transmitted from cells in the overlay network that are not part of any UE's detected set. In this case, the common PCI identity could be turned off for those overlay network cells.

Figure 20:
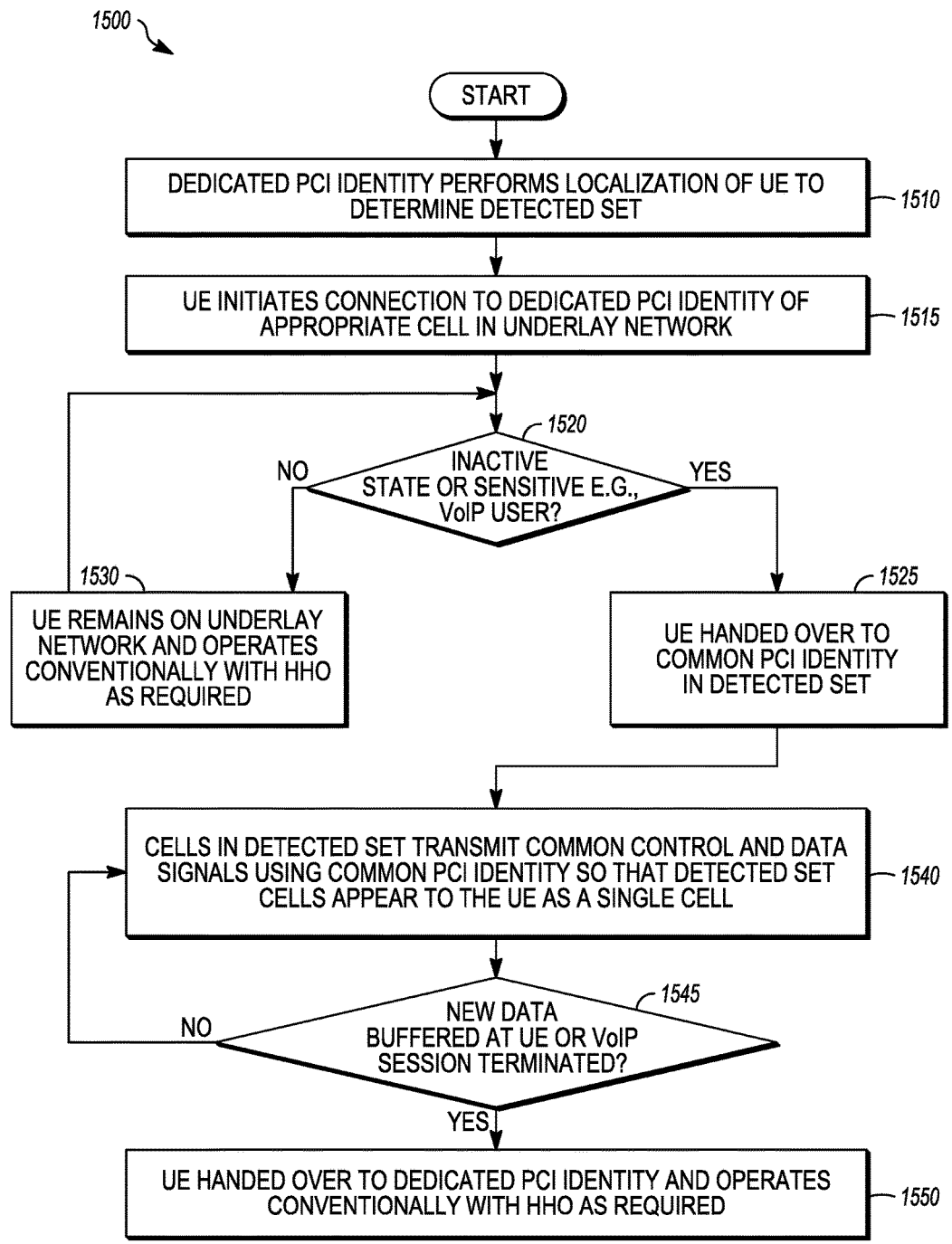
FIG. 20 is a flowchart of an illustrative method that may operate on the first network topology.

FIG. 20 is a flowchart of an illustrative method 1500 that may operate on the network topology 1400 shown in FIG. 19. As noted above, the dedicated PCI identity of cells in the small cell RAN will perform localization of UEs (as indicated by reference numeral 1510) to determine the detected set. The UE 125 will typically initiate a connection to a cell exposing a dedicated identity in the underlay network 1410 (1515). At decision block 1520, if the UE is in a C-DRX state due to inactivity or a user initiates a VoIP session and becomes a sensitive user, then the UE is handed over to a common PCI identity in a cell in the detected set on the overlay network 1405 (1525). Since this handover would likely occur under good signal conditions, the handover failure rate can typically be expected to be very small. If not an inactive or sensitive user, the UE remains on the underlay network and operates conventionally with HHOs as required as it moves between cells in the network (1530).

At block 1540, cells in the detected set are configured to transmit common control and data signals using their common PCI identities in the overlay network 1405 to the UE. The common transmission enables the detected set cells to appear as a single cell to the UE. Thus, no HHOs are needed as the UE moves through the small cell network while being serviced by the overlay network 1405.

At decision block 1545 if the user ceases to be a sensitive user (for example, by terminating a VoIP session), or if new data arrives at a UE's buffer in the C-DRX state (so that the UE is no longer in an inactive state), then the UE is handed back to the underlay network 1410 using dedicated PCIs and the UE operates conventionally with HHOs as required as it moves between cells in the network (1550).

Figure 21:
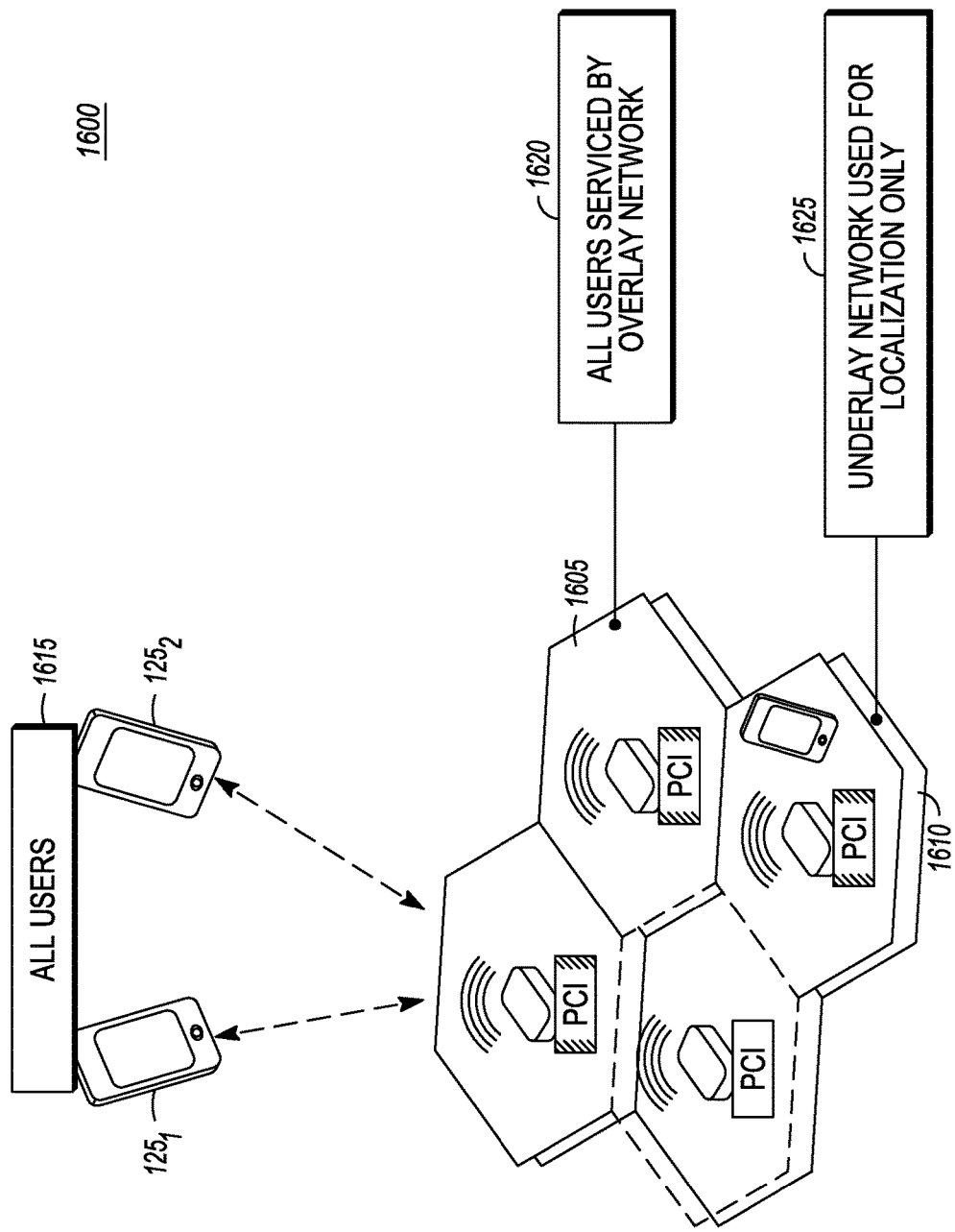
FIG. 21 shows a second illustrative network topology that utilizes dual identity cells.

FIG. 21 shows a second illustrative network topology 1600 that utilizes dual identity cells. In this example, all users 1615 are provided with communication services from the overlay network 1605 (as indicated by reference numeral 1620) and the underlay network 1610 is configured for localization of the UEs only (1625). In this case, since each identity is operated for different purposes, some role optimization can typically be implemented. For example, the dedicated PCI identities may be operated at lower power levels than the common PCI identities in order to reduce inter-cell interference, as described above.

Figure 22:
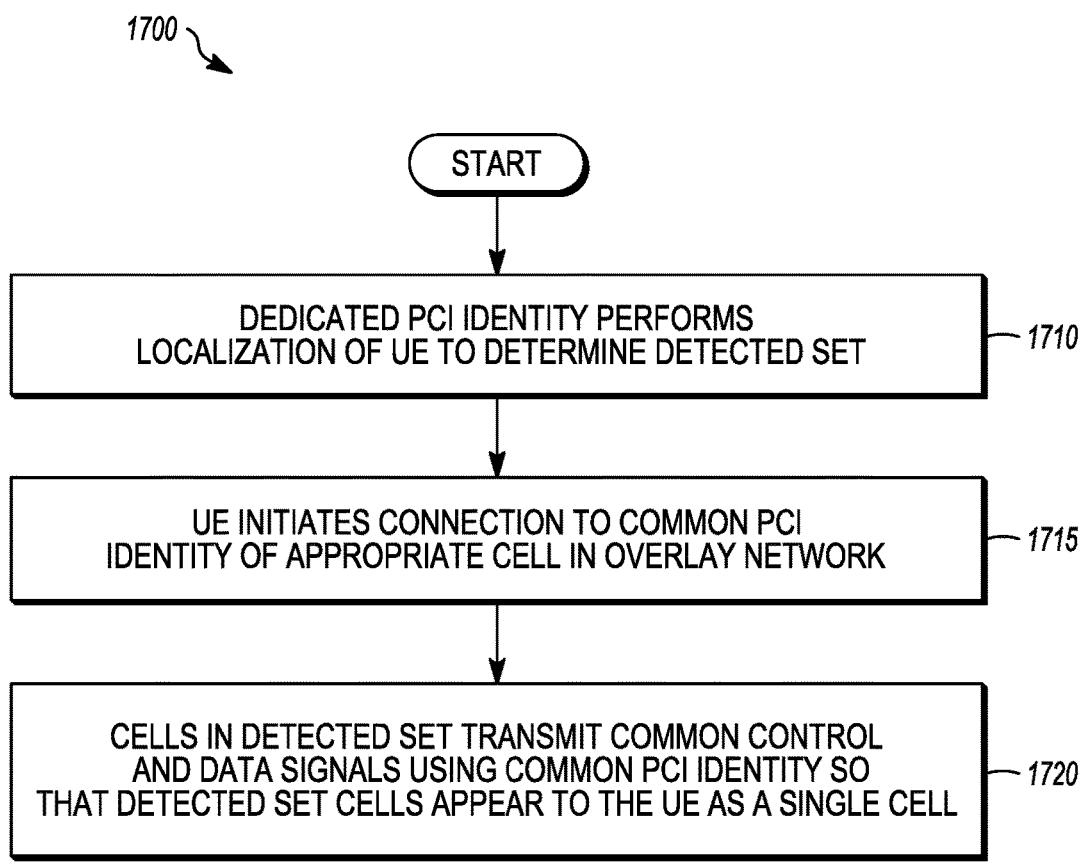
FIG. 22 is a flowchart of an illustrative method that may operate on the second network topology.

FIG. 22 is a flowchart of an illustrative method 1700 that may operate on the network topology 1600 shown in FIG. 21. The dedicated PCI identity of cells in the small cell RAN will perform localization of UEs (1710) to determine the detected set. The UE 125 can then typically initiate a connection to a common PCI identity of a cell in the overlay network 1605 (1715). Cells in the detected set are configured to transmit common control and data signals using their common PCI identities in the overlay network 1405 to the UE (1720). As with the illustrative example above, the common transmission enables the detected set cells to appear as a single cell to the UE. No HHOs are therefore needed as the UE moves through the small cell network while being serviced by the overlay network 1605.

Figure 23:
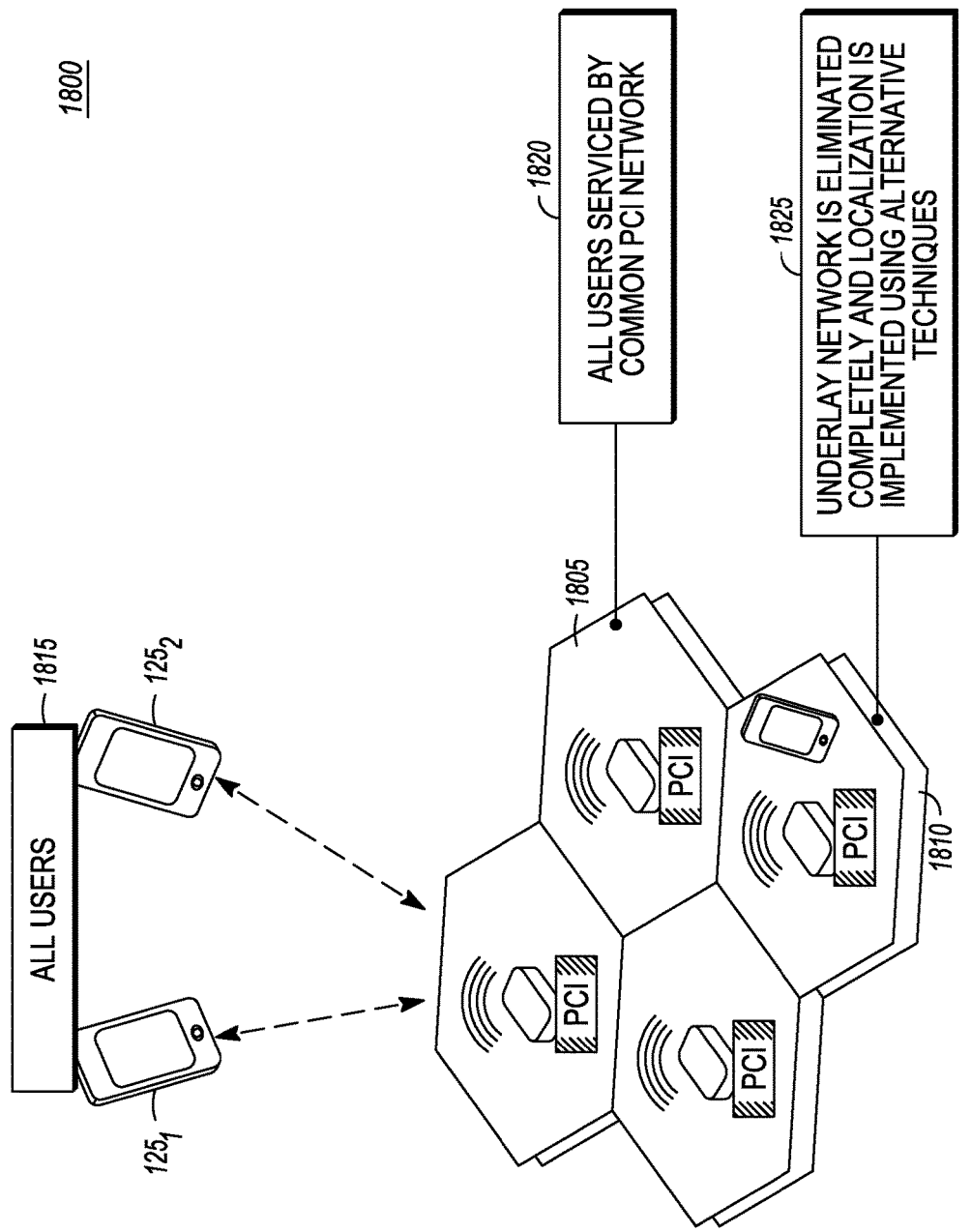
FIG. 23 shows a third illustrative network topology that utilizes common PCI cells but no dedicated PCI cells.

FIG. 23 shows a third illustrative network topology 1800 that utilizes common PCI cells. In this example, all users 1815 are provided with communication services from the overlay network 1805 (as indicated by reference numeral 1820) and the underlay network 1810 (shown in phantom lines for reference only) is completely eliminated from the topology so that no dedicated PCIs are used. The loss of the underlay network means that the UEs cannot be localized using the MRM received from the UEs since the cells in the overlay network 1805 are indistinguishable by the UE. In some implementations, the underlay network can be eliminated from the network topology 1800 using selectively operable dual identity cells, as described above, by turning off the dedicated PCI identities of the cells in the network.

Figure 24:
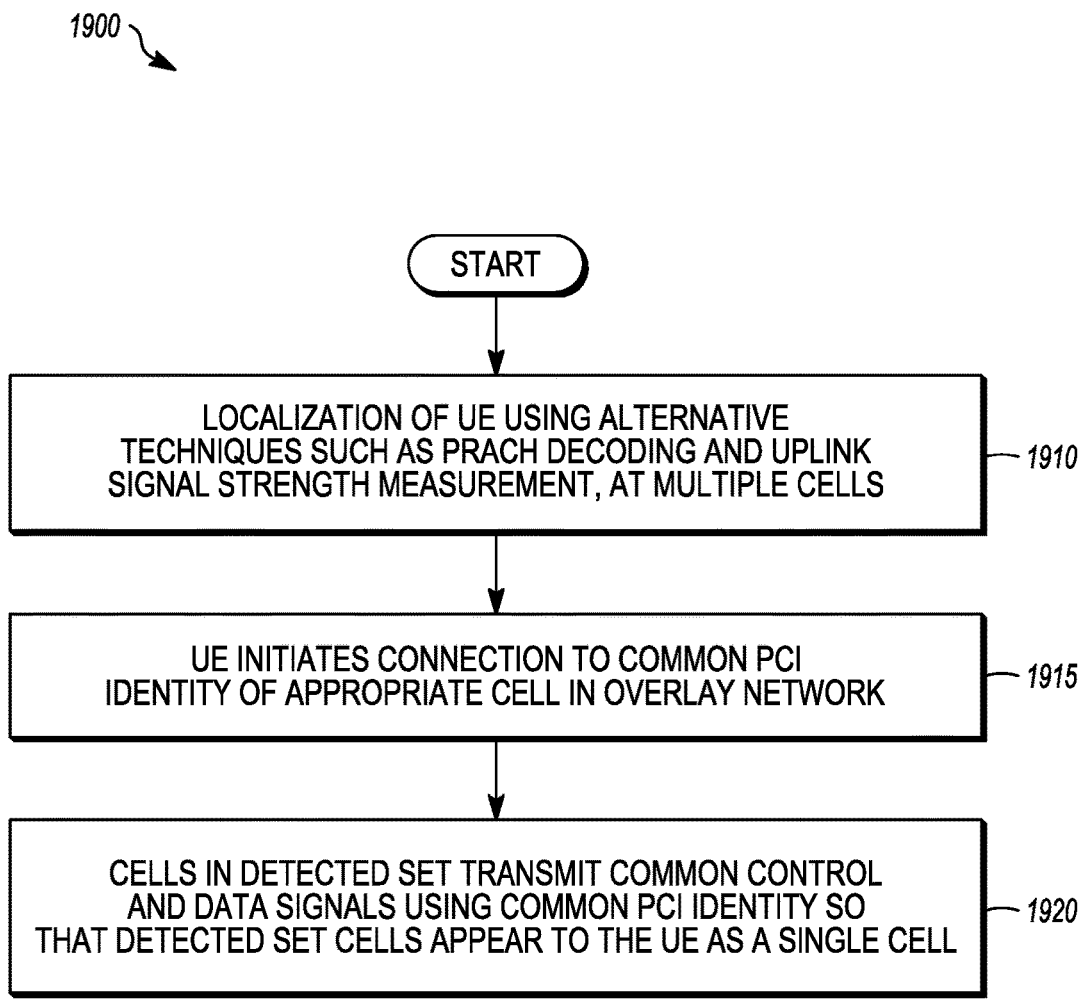
FIG. 24 is a flowchart of an illustrative method that may operate on the third network topology.

Without received MRMs, localization of the UEs within the small cell RAN is performed at the small cells using other techniques. As shown in the illustrative method 1900 in the flowchart in FIG. 24, such alternatives can be based on PRACH (Physical Random Access Channel) decodes or by measuring uplink signal strength of a UE at multiple cells, for example, using SRS or by paging an inactive UE from multiple cells (as indicated by reference numeral 1910).

The remaining steps of the method 1900 are similar to those in the above example. The UE 125 can initiate a connection to a common PCI identity of a cell in the overlay network 1805 (1915). Cells in the detected set are configured to transmit common control and data signals using their common PCI identities in the overlay network 1405 to the UE (1920) so that the detected set cells appear as a single cell to the UE.

Figure 25:
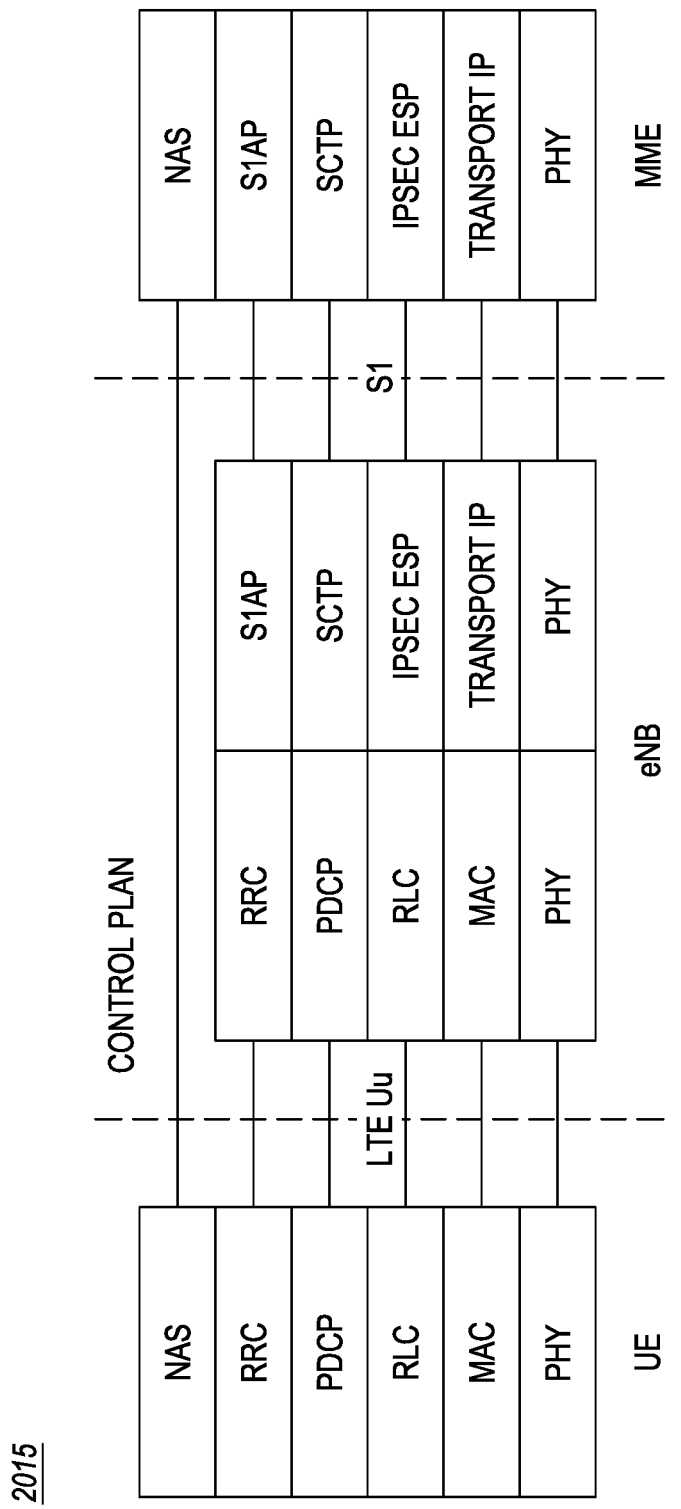
FIGS. 25 and 26 respectively show control plane protocol stacks as arranged in accordance with LTE and as modified in accordance with the present common PCI arrangement.
Figure 26:
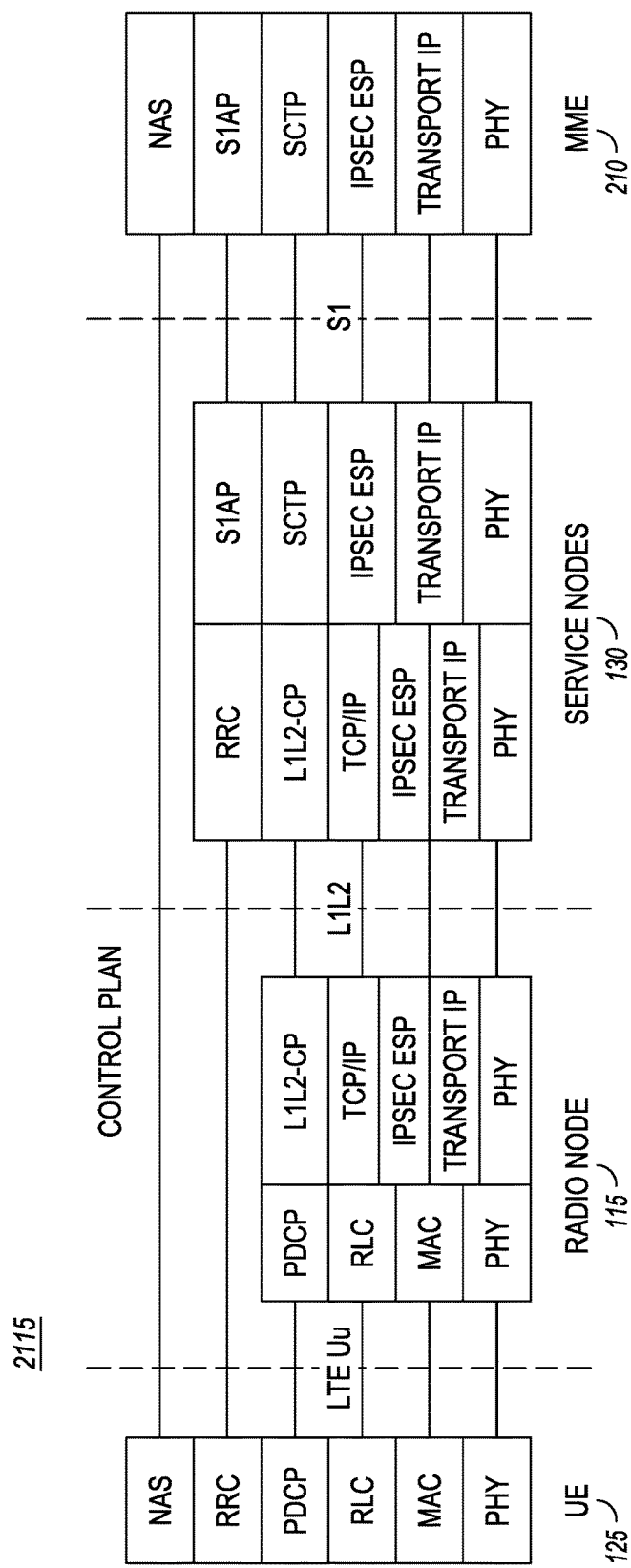
Figure 27:
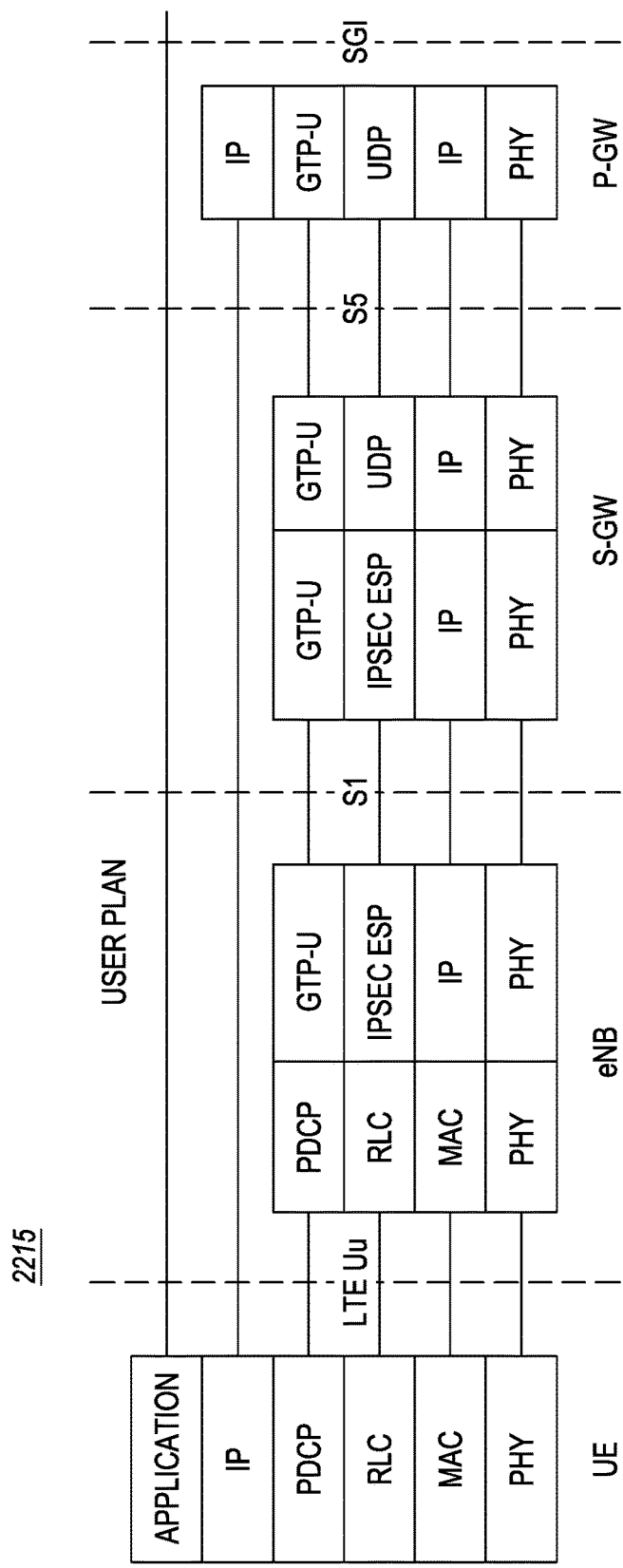
FIGS. 27 and 28 respectively show user plane protocol stacks as arranged in accordance with LTE and as modified in accordance with the present common PCI arrangement.
Figure 28:
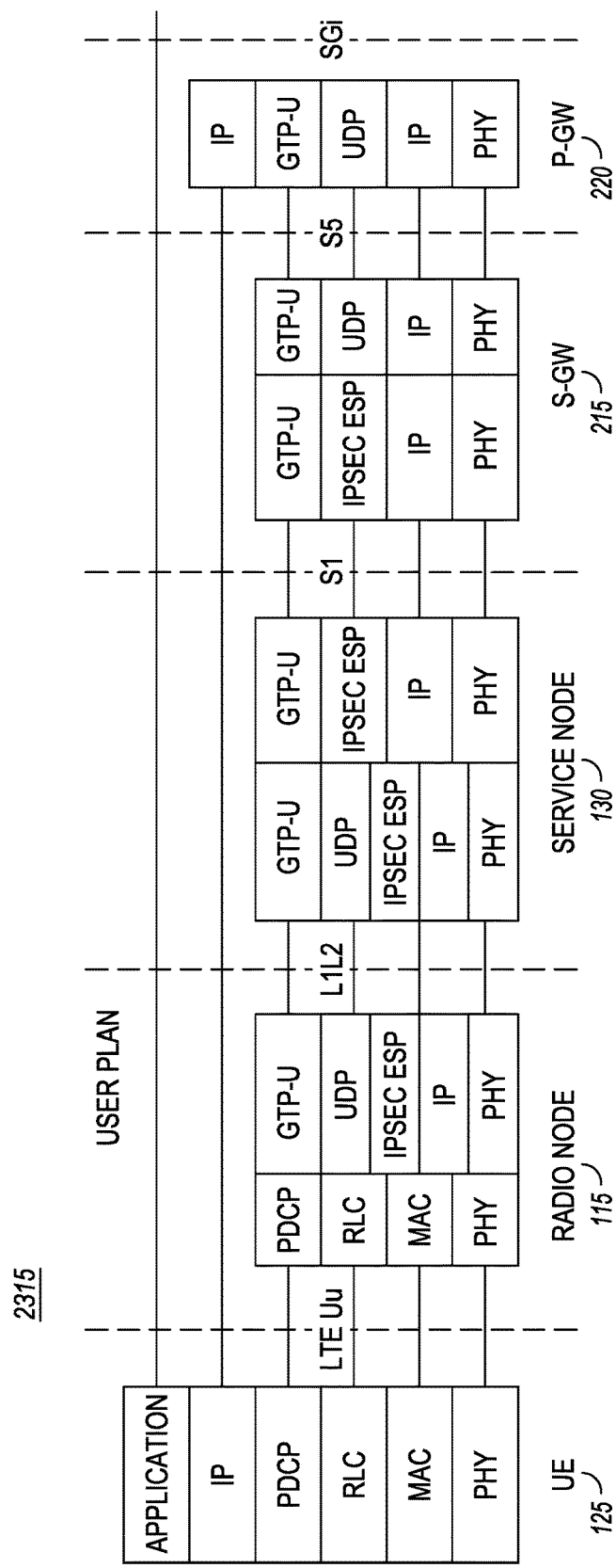

In the discussion of protocol stacks that follows, the acronyms used in the drawings (FIGS. 25-29) are spelled out below:

NAS Non-access stratum
RRC Radio Resource Control
PDCP Packet Data Convergence Protocol RLC Radio Link Control
MAC Media Access Control
PHY Physical layer
TCP/IP Transmission Control Protocol/Internet Protocol
IPsec ESP Internet Protocol Security Encapsulating Security Payload
SCTP Stream Control Transmission Protocol
GTP-UGPRS Tunneling Protocol User Plane (GPRS—General Packet Radio Service)
UDP User Datagram Protocol FIGS. 25 and 26 respectively show a control plane protocol stack 2015 as arranged in accordance with LTE and a control plane protocol stack 2115 as modified in accordance with the present dual identity cell. As shown in FIG. 21, the services node 130 is transparently located between the radio node 115 and the MME 210. Unlike the standard LTE control plane stack in FIG. 25, the RRC layer is terminated at the services node and not at the individual radio nodes 115. FIGS. 27 and 28 respectively show a user plane protocol stack 2215 as arranged in accordance with LTE, and a user plane protocol stack 2315 as modified in accordance with the present dual identity cell. In a similar manner as the control plane stack 2115, the services node 130 here is transparently located between the radio node 115 and S-GW 215. The services node 130 is typically expected to be a pass-through except for IPSec translation.

The presence of the services node 130 enables use of the hybrid joint processing techniques noted above in the text accompanying element 1360 in FIG. 18. Since the common PCI identity transmits to the UE in a time synchronous manner, implementation of the approach may be simplified. Hybrid joint processing may be implemented as a modification of Joint Processing as described in 3GPP Release 11. The modification entails splitting processing between the small cell radio nodes 115 and the services node 130.

Figure 29:
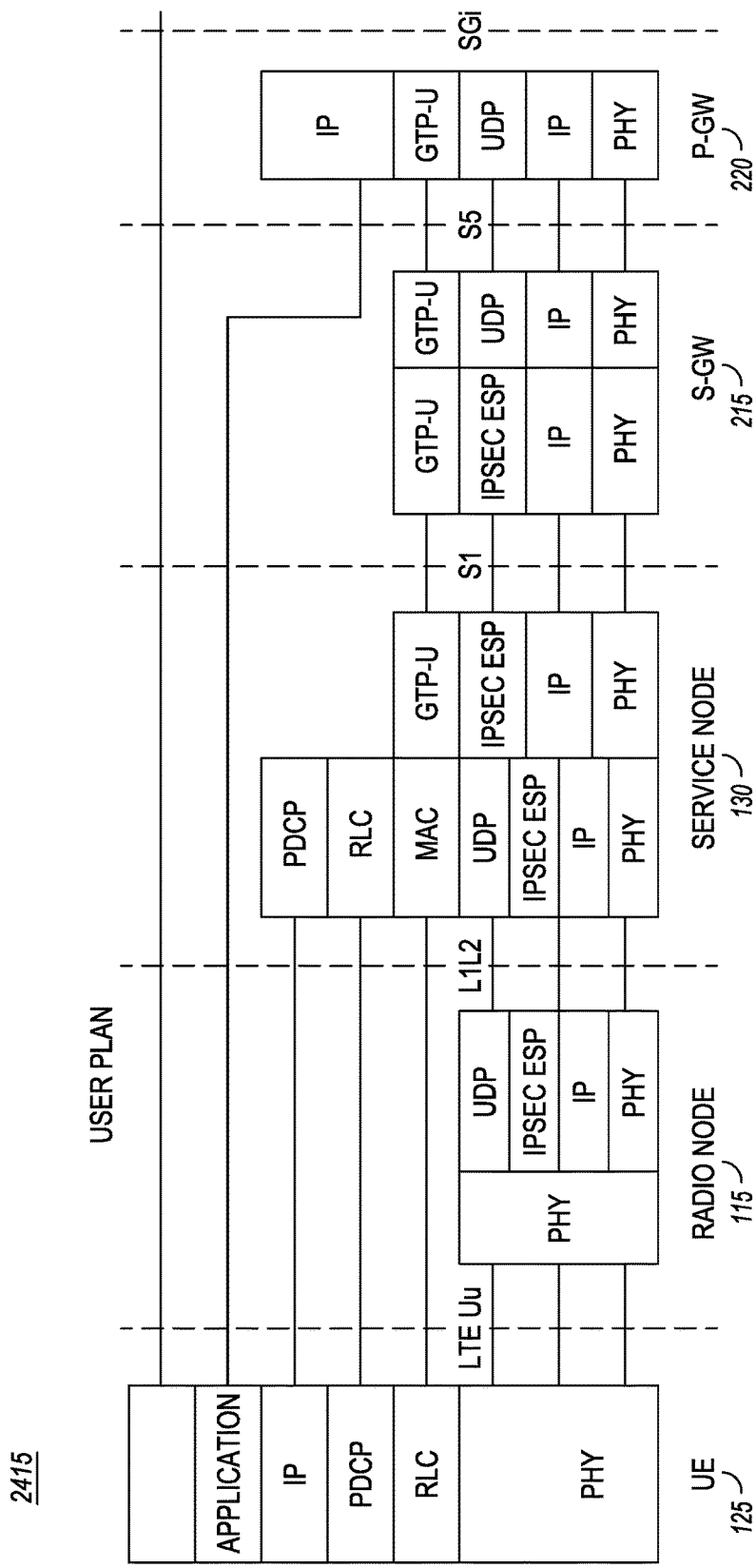
FIG. 29 shows a user plane protocol stack as arranged in accordance with LTE and as modified in accordance with the present common PCI arrangement.

For example, in the downlink, for certain UEs, the L2 stack (PDCP/RLC/MAC) may be hosted on the services node 130 while the L1 processing (PHY) remains on the radio nodes 115 (see the user plane protocol stack 2415 in FIG. 29). Downlink data (i.e., PDSCH—Physical Downlink Shared Channel) may be scheduled for simultaneous transmission from multiple cells potentially using the common PCI identity. These scheduling decisions can be made by the centralized scheduler 235 disposed at the services node 130 and the decisions may then be communicated to the MAC schedulers in the individual radio nodes 115.

With the MAC layer residing on the services node 130, the latency between the radio nodes 115 and the services node may be larger than the fastest HARQ (Hybrid Automatic Repeat Request) turn-around time of 8 ms. Therefore, hosting the L2 stack on the services node would be feasible for lower data rate users that can tolerate larger HARQ delays (It is noted that DL HARQ is asynchronous and thus retransmissions may be delayed) or those that can operate without HARQ retransmissions (e.g., VoIP users configured to have very low first-transmission block error rate (BLER)).

In the uplink, for certain UEs, the L2 stack may again be hosted on the services node 130 while the L1 processing remains on the radio nodes 115. The centralized scheduler 235 may instruct multiple radio nodes 115 to simultaneously decode a UE's transmission and these scheduling decisions are communicated to the individual schedulers 240 in the radio nodes. The decoded MAC PDUs (Protocol Data Unit) may be delivered separately from the individual radio nodes to the MAC layer in the L2 stack at the services node.

The MAC layer on the services node 130 will typically need to be enhanced to perform de-duplication of MAC PDUs before HARQ retransmissions. The benefit of macro-diversity is that a HARQ retransmission may be avoided even if only one among the multiple radio nodes successfully decodes the UL transmission from the UE. It is noted that this is unlike HSUPA (High Speed Uplink Packet Access), where the de-duplication and reordering operations are performed in the MAC-es layer in the RNC (Radio Network Controller) after HARQ retransmissions.

In an illustrative example, hybrid joint processing techniques may be implemented using the network topology 1600 shown in FIG. 21 and described in the accompanying text. Here, hybrid joint processing may be used with cell-interior UEs handled through an L2 stack in the individual cells and cell-edge UEs handled through the centralized L2 stack in the services node 130.

Figure 30:
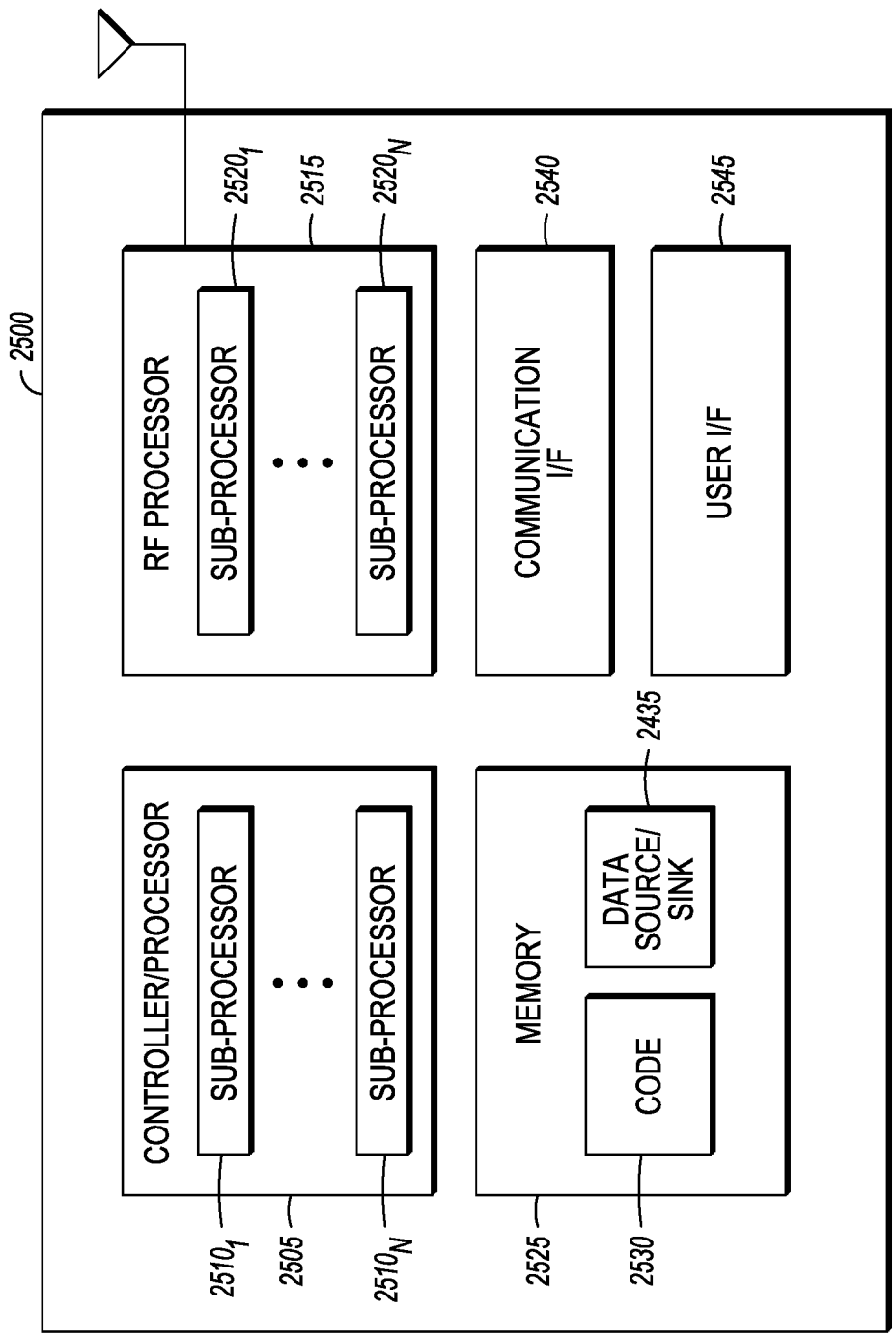
FIG. 30 shows a simplified functional block diagram of illustrative hardware infrastructure for a radio node that may be utilized to implement the present common PCI arrangement.

FIG. 30 shows a simplified functional block diagram 2500 of illustrative hardware infrastructure for a radio node that may be utilized to implement the present common PCI arrangement. A controller/processor 2505 typically handles high level processing. The controller/processor 2505 may include one or more sub-processors 2510 or cores that are configured to handle specific tasks or functions.

An RF processor 2515 implements various signal processing functions for the downlink including the lower level L1 processing. The RF processor 2515 may include one or more sub-processors 2520 or cores that are configured to handle specific tasks or functions. A memory 2525 stores computer-readable code 2530 that is executable by one or more processors in the dual identity radio node 1305 (FIG. 18) including the controller/processor 2505 and/or the RF processor 2515. The memory 2525 may also include various data sources and data sinks (collectively represented by element 2535) that may provide additional functionalities. For example, a data sink may be used to facilitate upper layer processing to the extent that such processing is implemented in the dual identity cell 1305.

The code 2530 in typical deployments is arranged to be executed by the one or more processors to implement the dual identity features shown in FIG. 18 by modifying the transport and physical channels via control of the L1 and/or L2 processing. The code 2530 additionally enables implementation of both the dedicated PCI identity and common PCI identity using the same hardware infrastructure in a given dual identity cell when executed.

The hardware infrastructure may also include various interfaces (I/Fs) including a communication I/F 2540 which may be used, for example, to implement a link to the services node 130 (FIG. 6), LAN, or to an external processor, control, or data source. In some cases, a user I/F 2545 may be utilized to provide various indications such as power status or to enable some local control of features or settings. It is noted that the block diagram 2500 may also be substantially applicable to a services node that may be utilized to implement the present common PCI arrangement. More particularly, the RF processor 2515 may be eliminated in some applications and any functionality that it provides that is needed to implement the services node may be provided by the controller/processor 2505.

Several aspects of telecommunication systems will now be presented with reference to various apparatus and methods described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors.

Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on computer-readable media. Computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of operating radio nodes in a small cell radio access network (RAN), the method comprising the steps of:
   a. configuring each of the radio nodes in the small cell RAN with distinct dual physical cell identities, a first identity of the distinct dual physical cell identities being a dedicated primary physical cell identity that is dedicated to that respective one of the radio nodes in the small cell RAN, and a second identity of the distinct dual physical cell identities being a common secondary physical cell identity that is common to multiple other radio nodes in the small cell RAN;
   b. operating the dedicated primary physical cell identity to provide a stable coverage layer, wherein the dedicated primary physical cell identity uses one or more Priority Access Licenses (PAL) channels that do not change; and
   c. operating the common secondary physical cell identity to provide a dynamic capacity layer, wherein the common secondary physical cell identity uses multiple Generic Authorized Access (GAA) channels, the multiple GAA channels being dynamically allocated as they become available and being selected from channels not allocated to the dedicated primary physical cell identity,
      wherein each of the radio nodes is configured to have the dedicated primary physical cell identity and the common secondary physical cell identity operating at the same time.

2. The method of claim 1, wherein the method of operating the radio nodes operates the radio nodes within a citizens broadband radio service.

3. The method of claim 1, such that the dedicated primary physical cell identity using PAL is protected from interference from the common secondary physical cell identity using GAA.

4. The method of claim 1, further comprising associating a services node with the radio nodes, wherein the services node provides a self organizing network functionality for the radio nodes.

5. The method of claim 4, wherein the self organizing network functionality provides an optimized allocation of GAA channels provided by a Spectrum Access System (SAS) across the radio nodes.

6. The method of claim 1, wherein the method of operating the radio nodes operates the radio nodes within a citizens broadband radio service, and further comprising associating a services node with the radio nodes, wherein the services node acts as a domain proxy for the citizens broadband radio service.

7. The method of claim 1, wherein the radio nodes act as Citizen Band Spectrum Devices (CBSDs).

8. The method of claim 1, wherein the dedicated primary physical cell identity is configured to operate at a lower power than the common secondary physical cell identity in order to reduce interference.

9. A radio node for use within a plurality of radio nodes in a small cell radio access network (RAN), the plurality of radio nodes organized by a services node, the services node providing a self organizing network functionality for the plurality of radio nodes, the radio node configured to have distinct dual physical cell identities, a first identity of the distinct dual physical cell identities being a dedicated primary physical cell identity that is dedicated to the radio node, and a second identity of the distinct dual physical cell identities being a common secondary physical cell identity that is common to multiple other radio nodes in the small cell RAN, such that the dedicated primary physical cell identity is configured to provide a stable coverage layer, wherein the dedicated primary physical cell identity uses one or more Priority Access Licenses (PAL) channels that do not change, and the common secondary physical cell identity is configured to provide a dynamic capacity layer, wherein the common secondary physical cell identity uses multiple Generic Authorized Access (GAA) channels, the multiple GAA channels being dynamically allocated as they become available and being selected from channels not allocated to the dedicated primary physical cell identity, and wherein the radio node is configured to have the dedicated primary physical cell identity and the common secondary physical cell identity operating at the same time.

10. The radio node of claim 9, wherein the plurality of radio nodes are part of a citizens broadband radio service.

11. The radio node of claim 9, such that the dedicated primary physical cell identity using PAL is protected from interference from the common secondary physical cell identity using GAA.

12. The radio node of claim 9, wherein the self organizing network functionality provides an optimized allocation of GAA channels provided by a Spectrum Access System (SAS) across the plurality of radio nodes.

13. The radio node of claim 9, wherein the plurality of radio nodes are configured to operate within a citizens broadband radio service, and wherein the services node is a domain proxy for the citizens broadband radio service.

14. The radio node of claim 9, wherein the plurality of radio nodes are configured as Citizen Band Spectrum Devices (CBSDs).

* * * * *